United States Patent
Abotabl et al.

(10) Patent No.: US 12,426,034 B2
(45) Date of Patent: Sep. 23, 2025

(54) UE BEHAVIOR WITH REFERENCE SIGNALS IN A FULL-DUPLEX SYMBOL

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Seyedkianoush Hosseini, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 17/921,313

(22) PCT Filed: Jun. 28, 2021

(86) PCT No.: PCT/US2021/039422
§ 371 (c)(1),
(2) Date: Oct. 25, 2022

(87) PCT Pub. No.: WO2022/005997
PCT Pub. Date: Jan. 6, 2022

(65) Prior Publication Data
US 2023/0354300 A1 Nov. 2, 2023

(30) Foreign Application Priority Data
Jun. 29, 2020 (GR) .............................. 20200100375

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0068* (2013.01); *H04L 5/0051* (2013.01); *H04L 5/14* (2013.01); *H04W 72/232* (2023.01)

(58) Field of Classification Search
CPC ............ H04W 72/1263; H04W 72/232; H04L 1/0068; H04L 5/0051; H04L 5/14
See application file for complete search history.

(56) References Cited

U.S. PATENT DOCUMENTS

| | | | |
|---|---|---|---|
| 10,425,962 B2 | 9/2019 | Wang et al. | |
| 2014/0146770 A1* | 5/2014 | Iwai ...................... | H04L 5/0073 370/329 |

(Continued)

FOREIGN PATENT DOCUMENTS

| | | |
|---|---|---|
| WO | 2018112093 | 6/2018 |
| WO | 2019155637 A1 | 8/2019 |

OTHER PUBLICATIONS

Nokia, et al., "Resource Allocation/coordination Between Parent BH and Child links", 3GPP TSG RAN WG1 Meeting #95, R1-1812702, Spokane, USA, Nov. 12, 2018-Nov. 16, 2018, 11 Pages, Nov. 3, 2018, p. 1-p. 15.

(Continued)

*Primary Examiner* — Deepa Belur
(74) *Attorney, Agent, or Firm* — Kevin M. Donnelly; ArentFox Schiff LLP

(57) ABSTRACT

A user equipment (UE) may be configured to transmit or receive reference signals in flexible symbols that are indicated as used for full duplex communications. The UE may transmit or receive reference signals over frequency resources of a symbol indicated as a flexible symbol, which may configured for uplink or downlink communications, that is also configured as full duplex, which may include frequency resources for both uplink and downlink communications. The UE may determine whether or how to trans- (Continued)

mit one or more reference signals in a flexible symbol based on at least one of the bandwidth of the uplink resources or the bandwidth of the downlink resources, the frequency positions of the reference signals, or other criteria. A base station may be configured to similarly transmit or receive reference signals in flexible symbols that are indicated as used for full duplex communications.

30 Claims, 19 Drawing Sheets

(51) Int. Cl.
     *H04L 5/00*         (2006.01)
     *H04L 5/14*         (2006.01)
     *H04W 72/232*    (2023.01)

(56) References Cited

U.S. PATENT DOCUMENTS

| | | | |
|---|---|---|---|
| 2019/0306923 A1 | 10/2019 | Xiong et al. | |
| 2021/0058219 A1* | 2/2021 | Kimura | H04L 5/14 |
| 2022/0191832 A1* | 6/2022 | Yokomakura | H04W 72/02 |
| 2022/0279360 A1* | 9/2022 | Matsumura | H04L 5/0017 |

OTHER PUBLICATIONS

International Search Report and Written Opinion issued in corresponding PCT/US2021/039422 dated Oct. 14, 2021.
3GPP TSG RAN WG1 Meeting #95, Spokane, WA, Nov. 12-16, 2018.

* cited by examiner

UE BEHAVIOR WITH REFERENCE SIGNALS IN A FULL-DUPLEX SYMBOL

CROSS-REFERENCE TO RELATED APPLICATIONS

This application is a 35 U.S.C.§ 371 National Phase of PCT Application No. PCT/US2021/039422, filed Jun. 28, 2021, which claims priority to, and the benefit of, Greek Patent Application No. 20200100375 filed on Jun. 29, 2020, entitled "UE BEHAVIOR WITH REFERENCE SIGNALS IN A FULL-DUPLEX SYMBOL," the contents of which are hereby incorporated by reference in their entireties.

BACKGROUND

Technical Field

The present disclosure relates generally to wireless communication, and more particularly, to transmitting or receiving reference signals in a full-duplex symbol.

INTRODUCTION

Wireless communication networks are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM)

A wireless communication network may include numerous network nodes including a core network, base stations in communication with the core network, and mobile devices (each referred to as a user equipment (UE)) served by the base stations. Typically, both a UE and a base station may transmit reference signals that may be used by the other one of the devices to assess the quality of one or more wireless communication channels between the UE and the BS. For example, a base station may transmit a downlink reference signal, such as a channel station information (CSI) reference signal (CSI-RS), or a demodulation reference signal (DMRS), on downlink resources for use by the UE for channel estimation. Similarly, the base station may schedule uplink resources for the UE to use to transmit an uplink reference signal, such as a sounding reference signal (SRS) or a DMRS, to the base station for use by the base station for channel estimation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure can be implemented in a method for wireless communication by a base station. The method includes scheduling at least one reference signal in a flexible symbol, wherein the flexible symbol is configurable for use as a downlink symbol or an uplink symbol, configuring the flexible symbol as a full duplex symbol having uplink resources and downlink resources, at least one of the uplink resources or the downlink resources overlapping at least one resource associated with the at least one reference signal, transmitting a configuration message indicating configuration of the flexible symbol as the full duplex symbol, and transmitting the at least one reference signal punctured around the uplink resources or in the at least one resource associated with the at least one reference signal.

Another innovative aspect of the subject matter described in this disclosure can be implemented in a method for wireless communication by a user equipment. The method includes receiving a scheduling message indicating at least one reference signal, in a flexible symbol, scheduled for reception by the UE, wherein the flexible symbol is configurable for use as a downlink symbol or an uplink symbol, receiving a configuration message configuring the flexible symbol as a full duplex symbol having uplink resources and downlink resources, at least one of the uplink resources or the downlink resources overlapping at least one resource associated with the at least one reference signal, and at least one of refraining from measuring the at least one reference signal, or measuring at least a subset of a plurality of reference signals, wherein the at least one reference signal includes the plurality of reference signals in the flexible symbol, and wherein resources associated with at least the subset of the plurality of reference signals at least partially overlap the downlink resources.

Another innovative aspect of the subject matter described in this disclosure can be implemented in an apparatus for wireless communication including a transceiver, a memory configured to store instructions, and one or more processors communicatively coupled with the memory and the transceiver. The one or more processors are configured to execute the instructions to cause the apparatus to schedule at least one reference signal in a flexible symbol, wherein the flexible symbol is configurable for use as a downlink symbol or an uplink symbol, configure the flexible symbol as a full duplex symbol having uplink resources and downlink resources, at least one of the uplink resources or the downlink resources overlapping at least one resource associated with the at least one reference signal, transmit a configuration message indicating configuration of the flexible symbol as the full duplex symbol, and transmit the at least one reference signal punctured around the uplink resources or in the at least one resource associated with the at least one reference signal.

Another innovative aspect of the subject matter described in this disclosure can be implemented in an apparatus for wireless communication including a transceiver, a memory configured to store instructions, and one or more processors communicatively coupled with the memory and the transceiver. The one or more processors are configured to execute the instructions to cause the apparatus to receive a scheduling message indicating at least one reference signal, in a flexible symbol, scheduled for reception by the UE, wherein the flexible symbol is configurable for use as a downlink symbol or an uplink symbol, receive a configuration message configuring the flexible symbol as a full duplex symbol having uplink resources and downlink resources, at least one of the uplink resources or the downlink resources overlapping at least one resource associated with the at least one reference signal, and at least one of refrain from measuring the at least one reference signal, or measure at least a subset of a plurality of reference signals, wherein the at least one reference signal includes the plurality of reference signals in the flexible symbol, and wherein resources associated with at least the subset of the plurality of reference signals at least partially overlap the downlink resources.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

DETAILED DESCRIPTION

Figure 1:
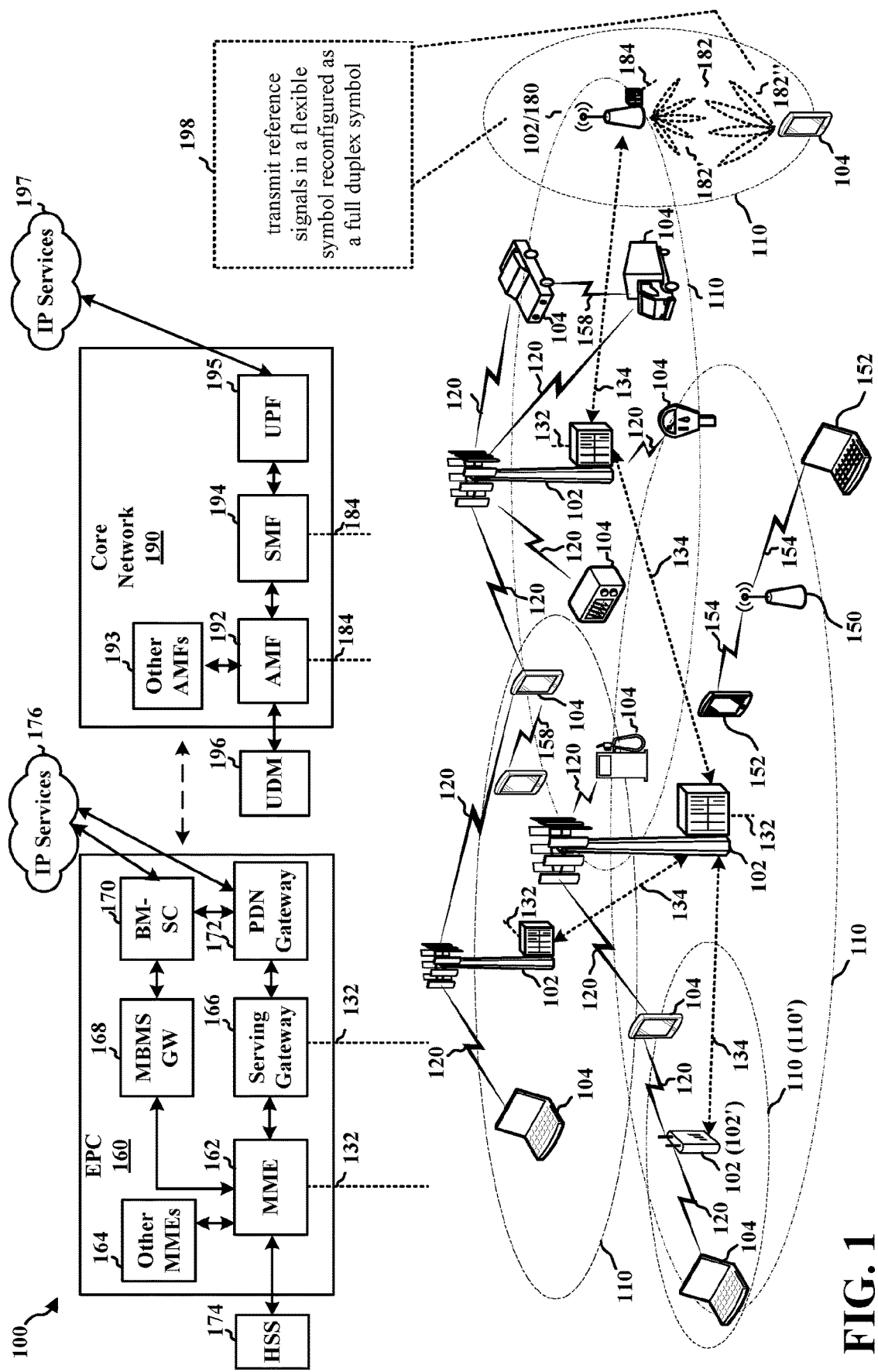
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

A wireless communication network may include numerous network nodes including a core network, base stations in communication with the core network, and mobile devices (each referred to as a user equipment (UE)) served by the base stations. Typically, both a UE and a base station may transmit reference signals that may be used by the other one of the devices to assess the quality of one or more wireless communication channels between the UE and the BS. For example, a base station may transmit a downlink reference signal, such as a channel station information (CSI) reference signal (CSI-RS) or a demodulation reference signal (DMRS), on downlink resources for use by the UE for channel estimation. Similarly, the base station may schedule uplink resources for the UE to use to transmit an uplink reference signal, such as a sounding reference signal (SRS) or a DMRS, to the base station for use by the base station for channel estimation.

In some deployments or scenarios, the base station may schedule one or more reference signals in a flexible symbol. In some examples, the flexible symbol may be configured as a full duplex symbol including uplink and downlink resources. Because the bandwidths of the uplink and downlink resources in a full duplex symbol may vary, the reference signals scheduled to be transmitted by the base station may not necessarily overlap with the downlink resources in the flexible symbol over which a downlink reference signal may typically be transmitted. Similarly, the reference signals scheduled to be transmitted by the UE may not necessarily overlap with the uplink resources in the flexible symbol over which an uplink reference signal may typically be transmitted.

Various aspects of the present disclosure generally relate to transmitting or receiving reference signals in flexible symbols that are indicated as used for full duplex communications. Some aspects more specifically relate to transmitting or receiving reference signals over frequency resources of a symbol indicated as a flexible symbol (for example, may be configured for uplink or downlink communications) that is also configured as full duplex (for example, may include frequency resources for both uplink and downlink communications). In some examples, the base station or the UE may determine whether or how to transmit one or more reference signals in a flexible symbol based on at least one of the bandwidth of the uplink resources or the bandwidth of the downlink resources, the frequency positions of the reference signals, or other criteria. In one example, the base station may transmit the reference signals by puncturing the reference signals around the uplink resources for transmission over downlink resources. In this example, the UE may receive the reference signals in the downlink resources of the flexible symbol. In another example, the UE may transmit the reference signals by shifting the frequency positions of the reference signals into the uplink resources of the flexible symbol for transmission. In this example, the base station may receive the reference signals in the uplink resources of the flexible symbol.

Particular aspects of the subject matter described in this disclosure can be implemented to realize one or more of the following potential advantages. In some aspects, the described techniques can be used to determine how to transmit, receive, or measure reference signals when flexible symbols are indicated as full duplex symbols. The described techniques may enable a base station and a UE to perform channel estimation and evaluate the qualities of the wireless communication channel between the base station and the UE when full duplex symbols are scheduled.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102*a* may operate in a licensed or an unlicensed frequency spectrum. When operating in an unlicensed frequency spectrum, the small cell 102*a* may employ NR and use the same 5 GHz unlicensed frequency spectrum as used by the Wi-Fi AP 150. The small cell 102*a*, employing NR in an unlicensed frequency spectrum, may boost coverage to or increase capacity of the access network.

A base station 102, whether a small cell 102*a* or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 or the base station 180 may be configured to transmit reference signals in a flexible symbol reconfigured as a full duplex symbol (198). Although the following description may be focused on 5G NR, the concepts described herein may be applicable to other similar areas, such as LTE, LTE-A, CDMA, GSM, and other wireless technologies."

Figure 2A:
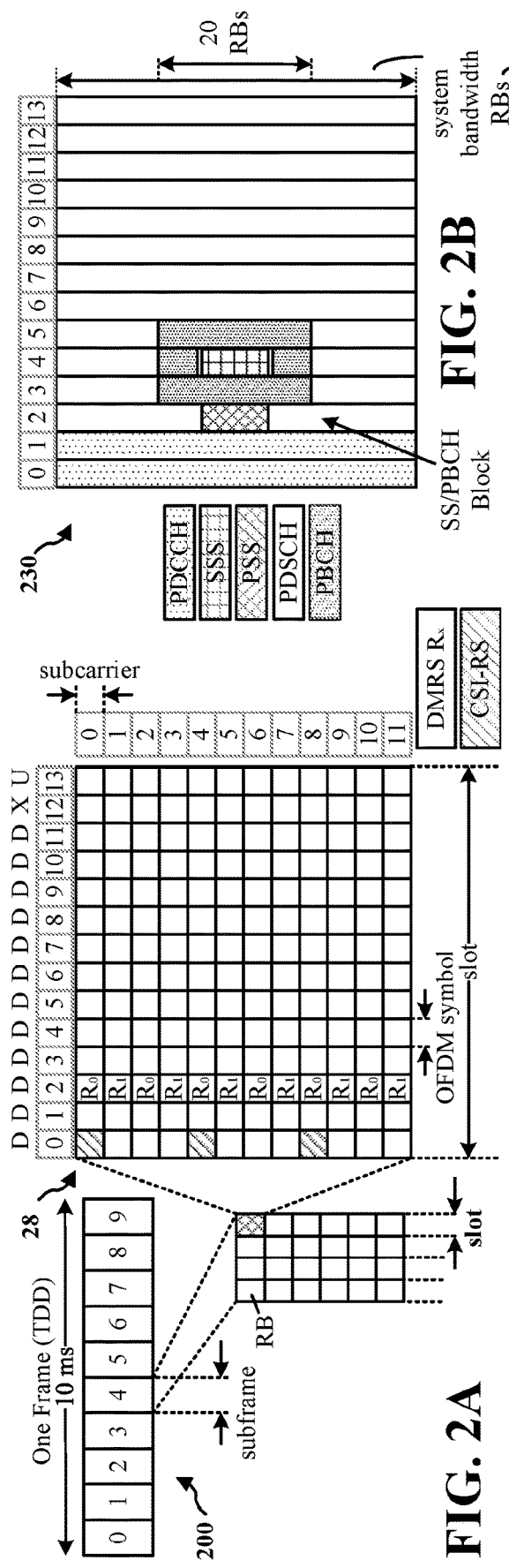
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
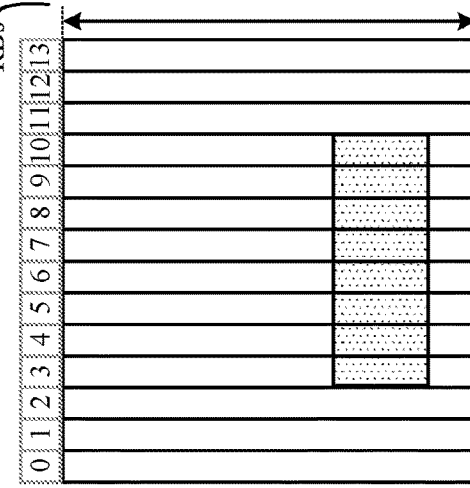
Figure 2C:
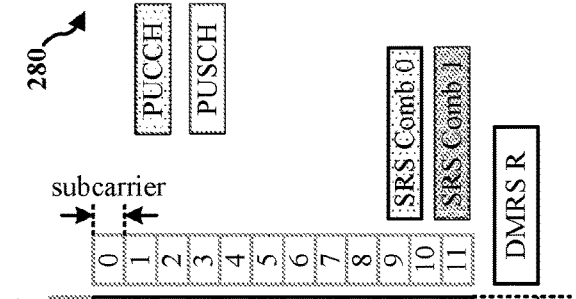
Figure 2D:
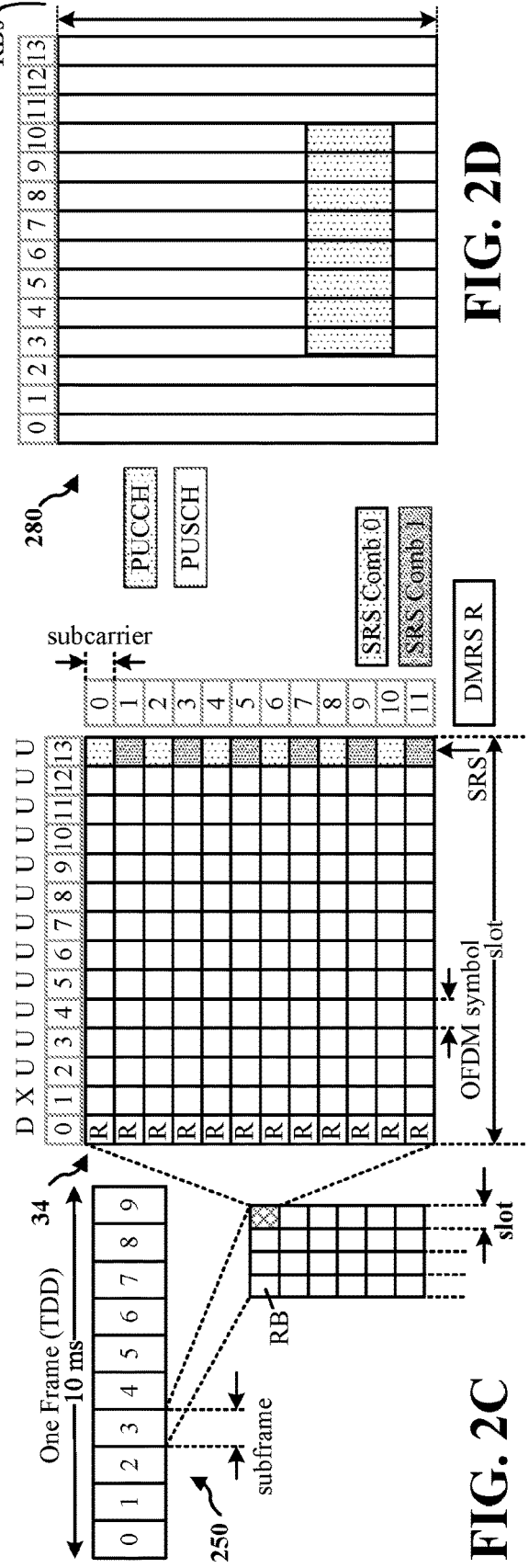

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
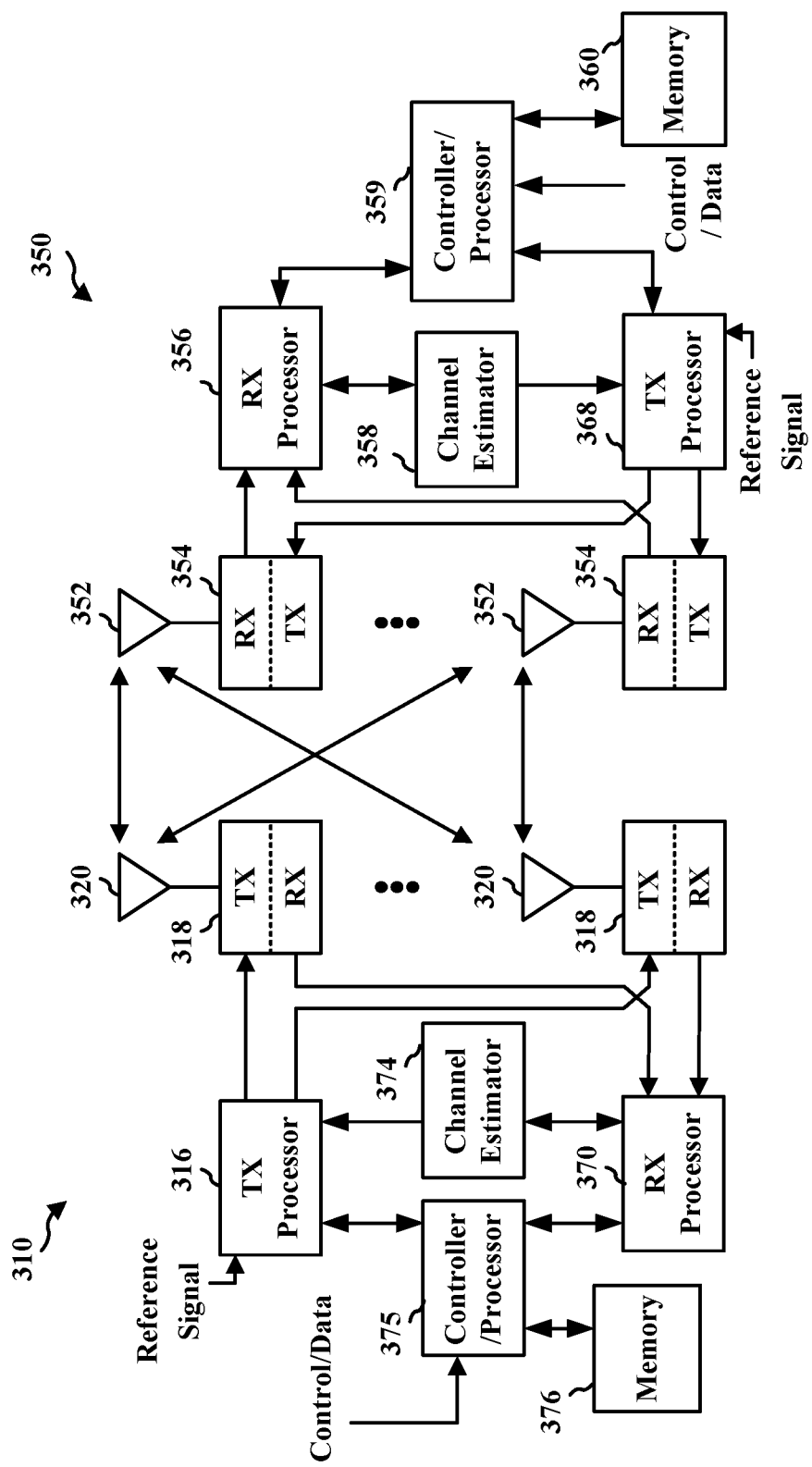
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, or the controller/processor 359 may be configured to perform aspects in connection with 198 of FIG. 1. Similarly, at least one of the TX processor 316, the RX processor 370, or the controller/processor 375 may be configured to perform aspects in connection with 198 of FIG. 1.

In some aspects, a base station in a wireless communication network may configure particular symbols as full duplex symbols to increase transmission and reception flexibilities. A base station and a UE may both transmit and receive in the same full duplex symbol. The base station may also schedule the transmission of reference signals, by the base station or the UE, to assess the qualities of the wireless communication channels between the base station and the UE. However, downlink reference signals to be transmitted by the base station may be scheduled on resources allocated for uplink transmissions and, similarly, uplink reference signals to be transmitted by the UE may be scheduled on resources allocated for downlink transmissions in the full duplex symbol. Therefore, aspects of the present disclosure involve determining which, if any, resources to use for the transmission of a reference signal in a full duplex symbol.

A full duplex symbol may be configured as an in-band full duplex symbol or a sub-band full duplex symbol. For an in-band full duplex symbol, the uplink resources and the downlink resources may overlap in time as well as frequency. Therefore, the base station or the UE may transmit and receive on overlapping time and frequency resources. For a sub-band full duplex symbol, the uplink resources and the downlink resources may overlap in time, but not in frequency. Therefore, the base station or the UE may transmit and receive on overlapping time resources but not overlapping frequency resources.

In some aspects, a base station may utilize two or more antenna panels for simultaneous transmission and reception operations associated with a full duplex symbol. For example, a first antenna panel may transmit downlink communications at edges of the band of the full duplex symbol, and a second antenna panel may receive uplink communications in a middle portion of the band of the full duplex symbol. The portion or portions of the band of the full duplex symbol configured for downlink communications may be referred to as a downlink band while the portion or portions of the band of the full duplex symbol configured for uplink communications may be referred to as an uplink band. In some examples, downlink and uplink bands may be separated by guard bands. Additionally or alternatively, in some examples, the base station may implement receive weighted overlap and add (RX-WOLA) to reduce an adjacent channel leakage ratio (ACLR) into the uplink transmission. The base station may also utilize an analog low-pass filter (LPF) to improve an analog-to-digital conversion (ADC) dynamic range, or may implement receive automatic gain control (RX-AGC) to improve a noise figure (NF).

Figure 4:
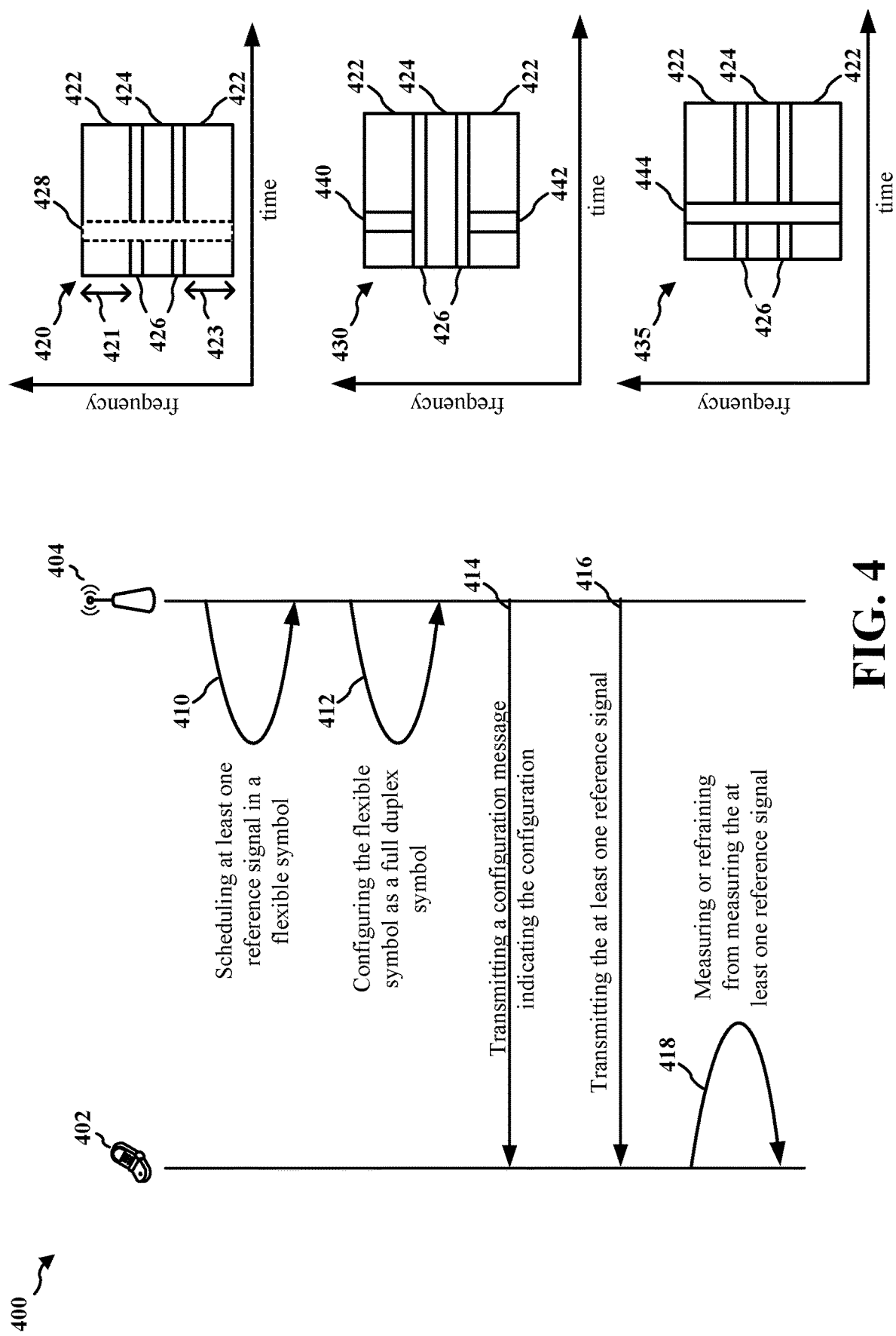
FIG. 4 is a flowchart illustrating the transmission of reference signals by base station in accordance with some aspects of the present disclosure.

FIG. 4 illustrates a flowchart illustrating the transmission of reference signals by a base station in accordance with some aspects of the present disclosure. In some aspects, the flowchart 400 may involve operations performed by a base station 404 and a UE 402. At 410, the base station 404 may schedule one or more reference signals 428 (hereinafter referred to as "the reference signal 428") in a flexible symbol. The reference signal 428 may be or include a downlink reference signal, such as a channel state information (CSI) reference signal (CSI-RS), a demodulation reference signal (DMRS), or a phase tracking reference signal (PTRS). The base station may transmit the reference signal 428 to the UE 402, which may perform measurements of the reference signal 428 for use in channel estimation or otherwise to estimate the channel quality or the interference on the channel. The configuration (for example, periodicity, frequency positions, and timing positions) of the reference signal 428 may be indicated to the UE 402 via one or more configuration messages.

At 412, the base station 404 may configure the flexible symbol as a full duplex symbol 420. The full duplex symbol 420 may include downlink resources 422, uplink resources 424, and guard bands 426 between the downlink resources 422 and the uplink resources 424. In the illustrated example, the downlink resources 422 are configured both above and below the uplink resources 424 in frequency. As such, the downlink resources 422 may have a total bandwidth equal to a sum of a first bandwidth 421 of the upper downlink resources 422 and a second bandwidth 423 of the lower downlink resources 422.

At 414, the base station 404 may transmit a configuration message to the UE 402 indicating the configuration of the full duplex symbol 420. The configuration may include the frequency locations (such as a starting frequency, an ending frequency and a bandwidth) of the downlink resources 422, the uplink resources 424, or the guard bands 426. In some examples, the configuration message includes a slot format indicator (SFI) indicating the configuration.

At 416, the base station 404 may transmit reference signals 440, 442, or 444, based on the resources of the reference signal 428, to the UE 402. The UE 402 may transmit the reference signals 440, 442, or 444 based on the resource configurations shown in a full-duplex symbol 430 or a full-duplex symbol 435. In a first example, the base station 404 may puncture the reference signals 440 and 442 around the uplink resources 424 based on the resource configuration shown in the full-duplex symbol 430. That is, while the resources scheduled by the base station 404 for the reference signal 428 may overlap the downlink resources 422, the uplink resources 424, and the guard bands 426 (as shown in the full-duplex symbol 420), the base station 404 may puncture the reference signals 440 and 442 by transmitting the reference signals 440 and 442 using resources overlapping the downlink resources 422, and not overlapping the uplink resources 424 or the guard bands 426 (as shown in the full-duplex symbol 430).

In a second example, the base station 404 may transmit the reference signals 444, based on the resource configuration shown in the full-duplex symbol 435, to the UE 402. The resources of the reference signals 444 may overlap the downlink resources 422, the uplink resources 424, and the guard bands 426 (as shown in the full-duplex symbol 435). The resources of the reference signals 444 may be substantially similar to the resources of the reference signal 428 scheduled by the base station 404. As such, the base station 404 may reallocate a portion of the uplink resources 424 or the guard bands 426 for the transmission of the reference signals 444. In some aspects, the base station 404 may allocate other resources in the downlink resources 422, the uplink resources 424, or the guard bands 426 for the transmission of reference signals.

Still referring to FIG. 4, at 418, the UE 402 may measure or refrain from measuring the one or more reference signal transmitted by the base station 404. The UE 402 may measure or refrain from measuring the one or more reference signal based on signaling from the base station 404, conditions or criteria indicated by the base station 404, or a combination thereof. In some aspects, after measuring the at least one reference signal, the UE 402 may report the results of the measurement to the base station 404.

In a first example, the UE 402 may refrain from measuring the reference signals 440 and 442, or the reference signals 444. In a second example, the UE 402 may measure the reference signals transmitted by the base station 404, such as the reference signals 440 and 442, or the reference signals 444. In a third example, the UE 402 may measure the reference signals including resources that overlap with the downlink resources 422, such as the reference signals 440 and 442. In a fourth example, the UE 402 may determine whether to measure or refrain from measuring the reference signals 440 and/or 442 based on a format of the downlink resources 422 and/or the uplink resources 424 (e.g., based on the total bandwidth of the downlink resources 422 (sum of the first bandwidth 421 and the second bandwidth 423) as compared to the uplink resources 424 or otherwise). The UE 402 may compare the total bandwidth with a threshold bandwidth. If the total bandwidth is less than the threshold bandwidth, the UE 402 may refrain from measuring the reference signals 440 and 442, or the reference signals 444. If the total bandwidth is greater than the threshold bandwidth, the UE 402 may measure the reference signals 440 and 442, or the reference signals 444.

In some aspects, the UE may configured with CSI-RS resource in a given flexible symbols and the SFI indicates a FD symbols that overrides this flexible symbol. In one aspect, the gNB may puncture the CSI-RS around the UL band. In another aspect, gNB may send the CSI-RS in the configured DL BWP of the UE regardless of the UL band. In some aspects, the gNB may use different CSI-RS configuration for the FD slot. In certain aspects, the UE may drop the measurement of CSI-RS. In one aspect, the UE may measure the CSI-RS in the DL BWP minus the UL band. In other aspects, UE behavior depends on the DL/UL bands format. For example, if the DL band BW goes below a certain threshold, the UE may drop the CSI-RS measurements. Aspects above may apply to CSI-RS, channel measurement, and/or interference measurement.

Figure 5:
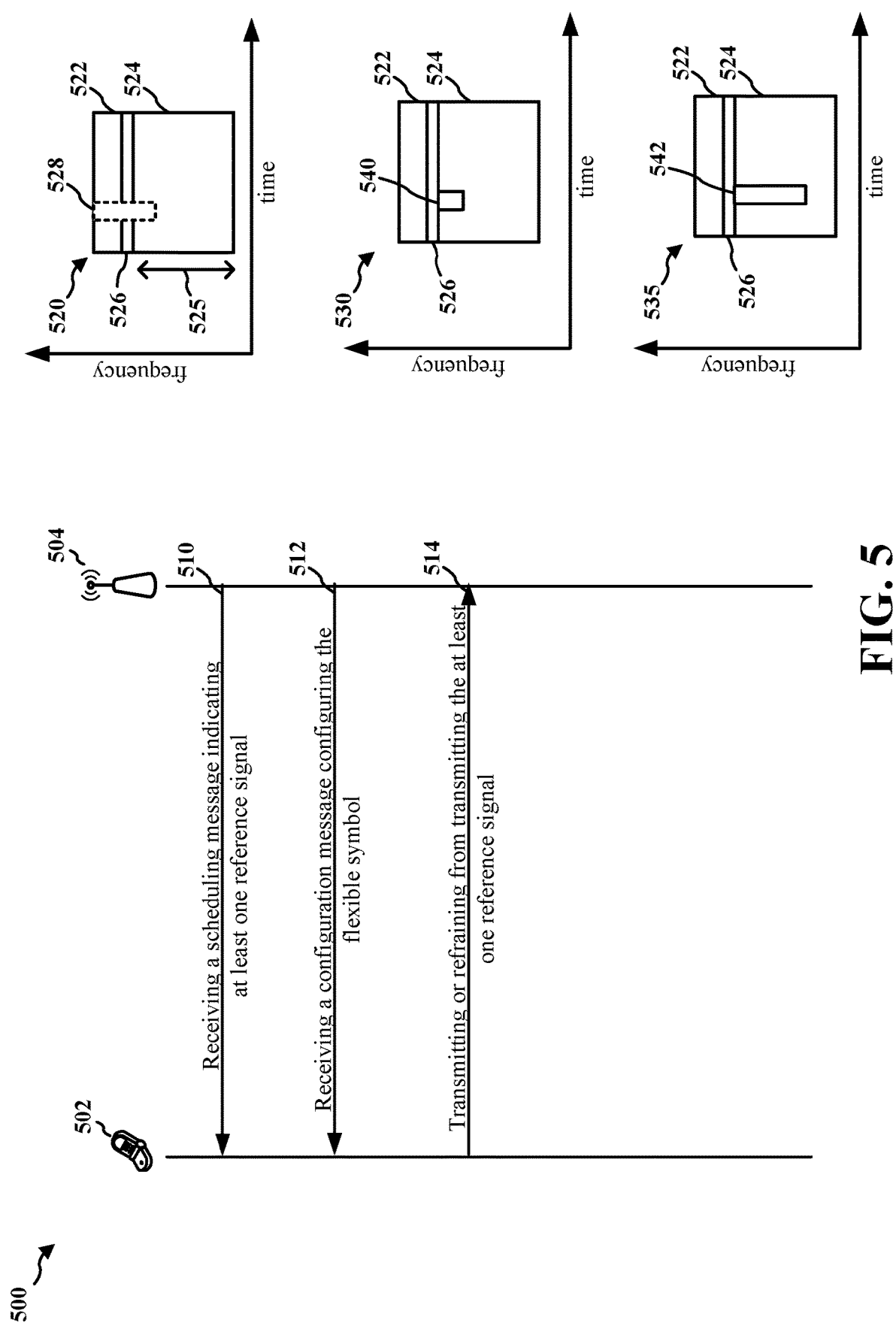
FIG. 5 is a flowchart illustrating the transmission of reference signals by a UE in accordance with some aspects of the present disclosure.

FIG. 5 illustrates a flowchart illustrating the transmission of reference signals by the UE in accordance with some aspects of the present disclosure. In some aspects, the flowchart 500 may involve the operations performed by a base station 504 and a UE 502. At 510, the UE 502 may receive a scheduling message indicating one or more reference signal 528 (hereinafter referred to as "the reference signal 528"), in a flexible symbol, scheduled for transmission by the UE 502. The scheduling message may indicate the resources allocated for the reference signal 528. The reference signal 528 may be a SRS.

At 512, in some implementation, the UE 502 may receive a configuration message configuring the flexible symbol as a full duplex symbol 520. The full duplex symbol 520 be configured with downlink resources 522, uplink resources 524, and a guard band 526 between the downlink resources 522 and the uplink resources 524. The uplink resources 524 may have a bandwidth 525. The configuration message may be a SFI.

At 514, in some aspects, the UE 502 may transmit or refrain from transmitting reference signal 540 or 542. The UE 502 may transmit or refrain from transmitting the reference signal 540 or 542 based on the frequency positions of the resources allocated for the reference signal 528, the frequency positions of the downlink resources 522, the frequency positions of the uplink resources 524, the bandwidth 525 of the uplink resources, or other factors. For example, the UE 502 may transmit the reference signal 540 allocated in a full-duplex symbol 530 or the reference signal 542 allocated in a full-duplex symbol 535.

In one examples, if the resources of the reference signal 528 completely overlap the uplink resources 524 (not shown in FIG. 5), the UE 502 may transmit the reference signal 528 in the resources scheduled for the reference signal 528.

In other instances, if the resources of the reference signal 528 does not completely overlap the uplink resources 524 (as shown in FIG. 5), the UE 502 may determine to transmit or refrain from transmitting one or of the reference signals 540 or 542. In a first example, the UE 502 may determine to refrain from transmitting any portion of the reference signal 528. In a second example, the UE 502 may puncture the reference signal 540 around the downlink resources 522 or the guard band 526 (as shown in the full-duplex symbol 530). That is, while the resources of the reference signal 528 may overlap the downlink resources 522, the uplink resources 524, and the guard band 526, the UE 502 may puncture the reference signal 540 by transmitting the reference signal 540 using resources overlapping the uplink resources 524, and not the downlink resources 422 or the guard bands 426 as shown in the full-duplex symbol 530.

In a third example, the UE 502 may transmit the reference signal 542. The UE 502 may determine to "shift" the reference signal 528, after the flexible symbol is configured as the full duplex symbol 520, into the uplink resources 524 (as shown in the full-duplex symbol 535). As a result, the reference signal 542 may have less, substantially the same, or more resources than the reference signal 528 scheduled by the base station 504. The reference signal 542 may be transmitted at the same or different times as the scheduled transmission time of the reference signal 528.

In a fourth example, the UE 502 may determine to transmit or refrain from transmitting based on the bandwidth 525 of the uplink resources 524. The UE 502 may compare the bandwidth 525 of the uplink resources 524 with a threshold bandwidth. If the bandwidth 525 is greater than the threshold bandwidth, the UE 502 may transmit the reference signal 540 or the reference signal 542. If the bandwidth 525 is less than the threshold bandwidth, the UE 502 may refrain from transmitting the reference signal 528.

In certain aspects, the UE may be configured with SRS resources in a given flexible symbols and the SFI indicates a FD symbol overriding this flexible symbol. In one aspect, if the UL BWP is within the UL band, the UE may transmit the SRS with the same configuration. In other aspects, the UE may drop the SRS transmission. In some aspects, the UE may puncture the SRS to fit the UL band. In certain aspects, the UE may transmit the SRS in the overlap between the UL band and the UL BWP by changing the SRS sequence such that it fits in the new transmission band. In some aspects, the UE behavior depends on the frequency domain indication. For example, the UE may transmit the SRS if the UL band BW is larger than a threshold and drops it if the UL band is less than or equal to the threshold.

Figure 6:
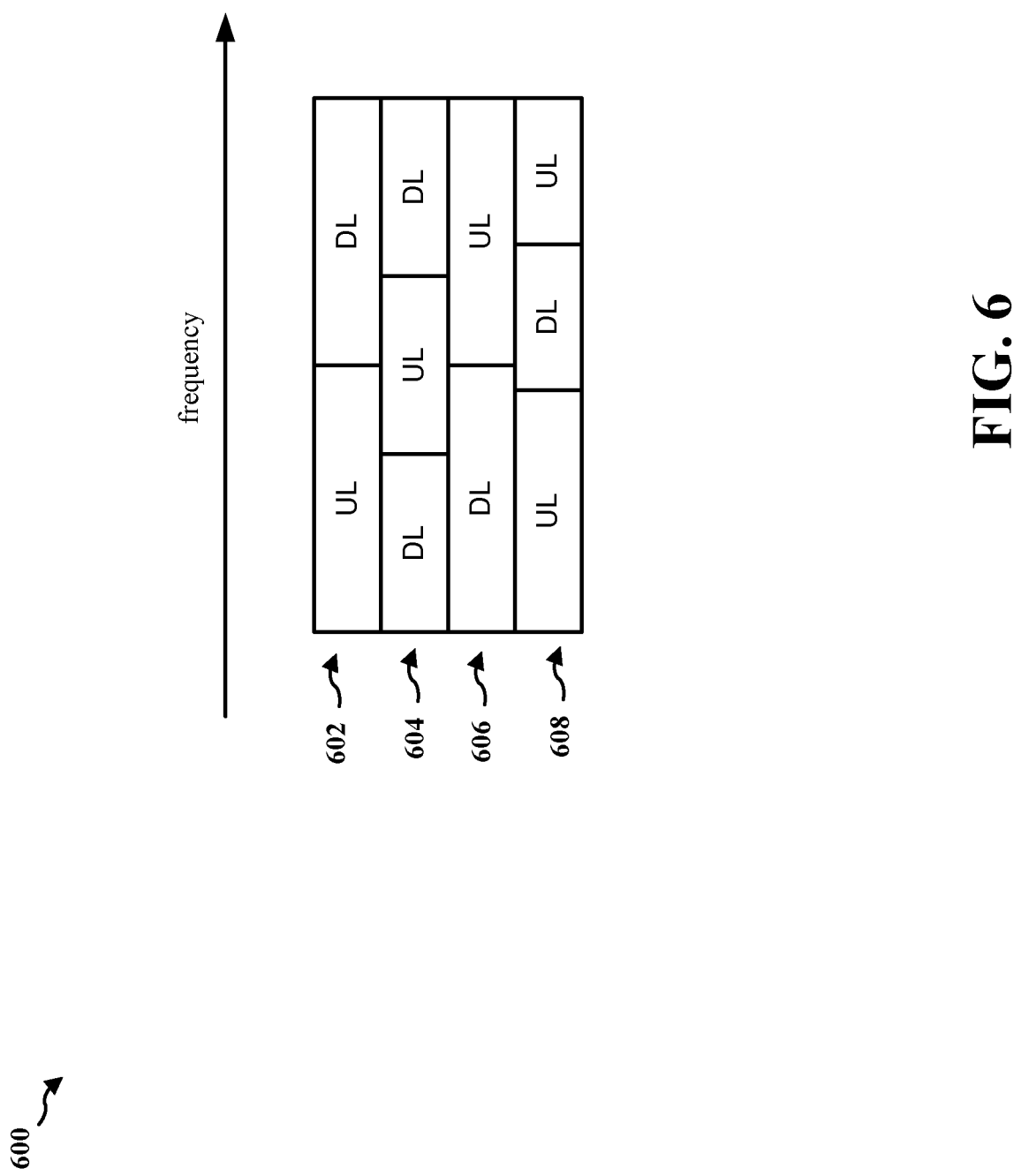
FIG. 6 is a diagram illustrating slot-frequency formats in accordance with some aspects of the present disclosure.

FIG. 6 illustrates a block diagram showing various slot-frequency combinations in accordance with some aspects of the present disclosure. In some aspects, the diagram 600 may show a first slot-frequency combination 602 including one uplink resource band-part and one downlink resource band-part. The diagram 600 may show a second slot-frequency combination 604 including one uplink resource band-part between two downlink resource band-parts with the same bandwidth. The diagram 600 may show a third slot-frequency combination 606 including one downlink resource band-part and one uplink resource band-part. The diagram 600 may show a fourth slot-frequency combination 608 including one downlink resource band-part between two uplink resource band-parts with different bandwidths. Other slot-frequency combinations may be possible.

In some aspects of the present disclosure, the base station may provide the frequency domain indication, such as the slot-frequency combinations, to the UE. In one example, the base station may signal the frequency domain indication to the UE via a DCI message. In some aspects, the base station may signal the frequency domain indication to the UE via a RRC message or a medium access control (MAC) control element (MAC CE). The UE may receive or measure downlink periodic signals, such as downlink reference signals, based on the frequency domain indication.

In one aspect, the base station may configure the frequency domain indication including one or more bits to indicate whether the UE should measure or refrain from measuring downlink periodic signals in a slot or a symbol. A first bit value of the one or more bits may indicate to the UE to measure the downlink periodic signals, such as downlink reference signals, and a second bit value may indicate to the UE to refrain from measuring the downlink periodic signals.

In another aspect of the present disclosure, the base station may configure the frequency domain indication to indicate the conditions for the UE to measure or refrain from measuring the downlink periodic signals. The frequency domain indication may include a threshold bandwidth. If the total bandwidth of one or more downlink resource band-part is larger than or equal to the threshold bandwidth, the UE may measure the downlink periodic signals. If the total bandwidth of the one or more downlink resources band-part is smaller than the threshold bandwidth, the UE may refrain from measuring the downlink periodic signals. The base station may signal other rules or criteria to determine whether to measure or refrain from measuring the downlink periodic signals.

In some aspects, the UE behavior with DL periodic signals may rely on one or more factors. In one aspect, for binary behaviors (dropping DL versus not dropping DL), each frequency domain indication may be configured with one bit determining the behavior. In certain aspects, for behaviors relying on a BW threshold, the UE may be configured with the threshold value. Based on the frequency domain indication, the UE may determine how to behave. Certain aspects may include separate indication of the UE behavior through RRC configuration, DCI, or MAC-CE.

Figure 7:
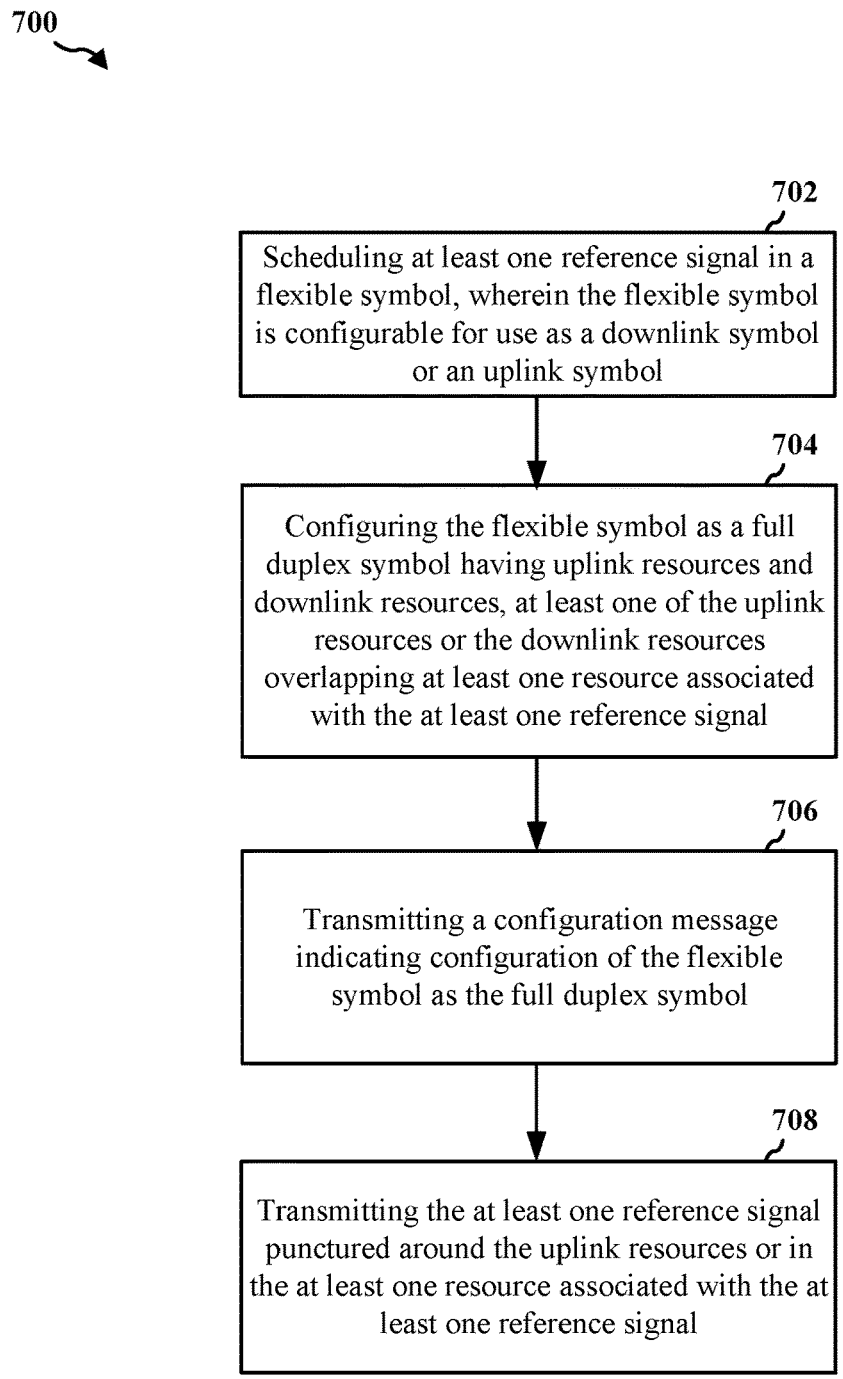
FIG. 7 is a flowchart illustrating a method of wireless communication that supports the transmission of reference signals by a base station in accordance with some aspects of the present disclosure.

FIG. 7 is a flowchart 700 of a method of wireless communication. The method may be performed by a base station (such as the base station 102, 310, 404 or 504; the apparatus 1602; the processing system 1814, which may include the memory 376 and which may be the entire base station 310 or a component of the base station 310, such as the TX processor 316, the RX processor 370, or the controller/processor 375).

At 702, the base station may schedule at least one reference signal in a flexible symbol, wherein the flexible symbol is configurable for use as a downlink symbol or an uplink symbol. For example, 702 may be performed by the scheduling component 1606 of the apparatus 1602. In some aspects, the base station may schedule (410) the reference signal 428 in a flexible symbol. The base station 102, 310, 404, or 504, the apparatus, 1602, the processing system 1814, the memory 376, the TX processor 316, the RX processor 370, the controller/processor 375, or the scheduling component 1606 may be configured to or provide the means for scheduling at least one reference signal in a flexible symbol, wherein the flexible symbol is configurable for use as a downlink symbol or an uplink symbol.

At 704, the base station may configure the flexible symbol as a full duplex symbol having uplink resources and downlink resources, at least one of the uplink resources or the downlink resources overlapping at least one resource associated with the at least one reference signal. For example, 704 may be performed by the configuration component 1608 of the apparatus 1602. In some aspects, the base station may configure (412) the flexible symbol as the full duplex symbol 420 having the uplink resources 424 and the downlink resources 422. The base station 102, 310, 404, or 504, the apparatus, 1602, the processing system 1814, the memory 376, the TX processor 316, the RX processor 370, the controller/processor 375, or the configuration component 1608 may be configured to or provide the means for configuring the flexible symbol as a full duplex symbol having uplink resources and downlink resources, at least one of the uplink resources or the downlink resources overlapping at least one resource associated with the at least one reference signal.

At 706, the base station may transmit a configuration message indicating configuration of the flexible symbol as the full duplex symbol. For example, 706 may be performed by the transmission component 1610 of the apparatus 1602. In some aspects, the base station may transmit (414) the configuration message. The base station 102, 310, 404, or 504, the apparatus, 1602, the processing system 1814, the memory 376, the TX processor 316, the RX processor 370, the controller/processor 375, or the transmission component 1610 may be configured to or provide the means for transmitting a configuration message indicating configuration of the flexible symbol as the full duplex symbol.

At 708, the base station may transmit the at least one reference signal punctured around the uplink resources or in the at least one resource associated with the at least one reference signal. For example, 708 may be performed by the transmission component 1610 of the apparatus 1602. In some aspects, the base station may transmit (416) the at least one reference signal. The base station 102, 310, 404, or 504, the apparatus, 1602, the processing system 1814, the memory 376, the TX processor 316, the RX processor 370, the controller/processor 375, or the transmission component 1610 may be configured to or provide the means for transmitting the at least one reference signal punctured around the uplink resources or in the at least one resource associated with the at least one reference signal.

Figure 8:
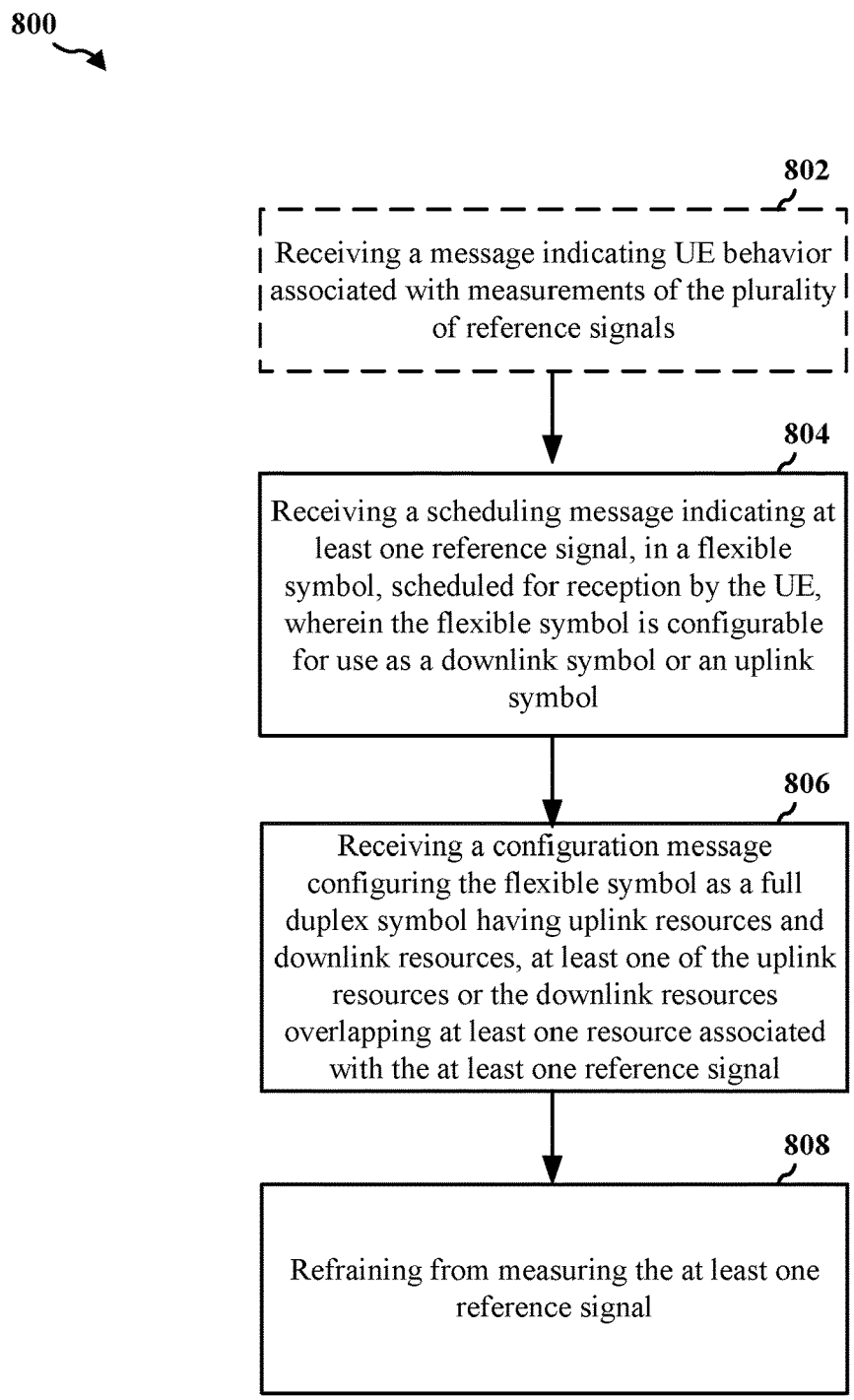
FIG. 8 is a flowchart illustrating a first method of wireless communication that supports the measuring of reference signals by a UE in accordance with some aspects of the present disclosure.

FIG. 8 is a flowchart 800 of a method of wireless communication. The method may be performed by a UE (such as the UE 104, 350, 402, or 502; the apparatus 1702; the processing system 1914, which may include the memory 360 and which may be the entire UE 350 or a component of the UE 350, such as the TX processor 368, the RX processor 356, or the controller/processor 359).

At 802, the UE may optionally receive a message indicating UE behavior associated with measurements of the plurality of reference signals. For example, 802 may be performed by the reception component 1704. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a third message indicating UE behavior associated with measurements of the plurality of reference signals.

At 804, the UE may receive a scheduling message indicating at least one reference signal, in a flexible symbol, scheduled for reception by the UE, wherein the flexible symbol is configurable for use as a downlink symbol or an uplink symbol. For example, 804 may be performed by the reception component 1704. In some aspects, the UE may receive a scheduling message indicating the reference signal 428, in a flexible symbol, scheduled for reception by the UE, wherein the flexible symbol is configurable for use as a downlink symbol or an uplink symbol. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a scheduling message indicating at least one reference signal, in a flexible symbol, scheduled for reception by the UE, wherein the flexible symbol is configurable for use as a downlink symbol or an uplink symbol.

At 806, the UE may receive a configuration message configuring the flexible symbol as a full duplex symbol having uplink resources and downlink resources, at least one of the uplink resources or the downlink resources overlapping at least one resource associated with the at least one reference signal. For example, 806 may be performed by the reception component 1704. In some aspects, the UE may receive a configuration message configuring the flexible symbol as the full duplex symbol as the full duplex symbol 420 having the uplink resources 424 and the downlink resources 422. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a configuration message configuring the flexible symbol as a full duplex symbol having uplink resources and downlink resources, at least one of the uplink resources or the downlink resources overlapping at least one resource associated with the at least one reference signal.

At 808, the UE may refrain from measuring the at least one reference signal. For example, 808 may be performed by the measurement component 1706. In some aspects, the UE may refrain (418) from measuring the reference signal 428. The UE 104, 350, 402, or 502, the apparatus, 1702, the processing system 1914, the memory 360, the TX processor 368, the RX processor 356, the controller/processor 359, or the measurement component 1706 may be configured to or provide the means for refraining from measuring the at least one reference signal.

Figure 9:
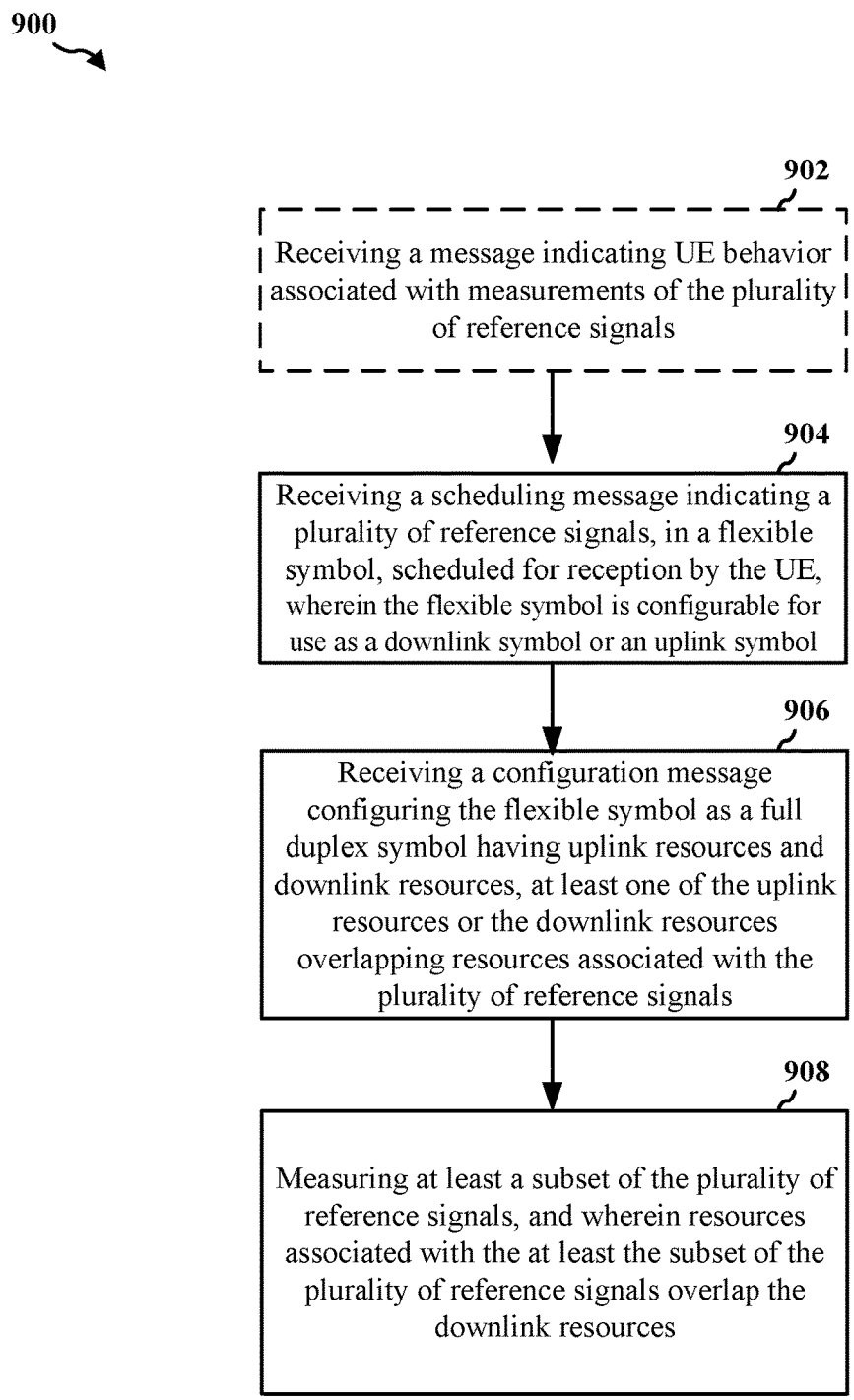
FIG. 9 is a flowchart illustrating a second method of wireless communication that supports the measuring of reference signals by a UE in accordance with some aspects of the present disclosure.

FIG. 9 is a flowchart 900 of a method of wireless communication. The method may be performed by a UE (such as the UE 104, 350, 402, or 502; the apparatus 1702; the processing system 1914, which may include the memory 360 and which may be the entire UE 350 or a component of the UE 350, such as the TX processor 368, the RX processor 356, or the controller/processor 359).

At 902, the UE may optionally receive a third message indicating UE behavior associated with measurements of the plurality of reference signals. For example, 902 may be performed by the reception component 1704. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a third message indicating UE behavior associated with measurements of the plurality of reference signals.

At 904, the UE may receive a scheduling message indicating a plurality of reference signals, in a flexible symbol, scheduled for reception by the UE, wherein the flexible symbol is configurable for use as a downlink symbol or an uplink symbol. For example, 904 may be performed by the reception component 1704. In some aspects, the UE may receive a scheduling message indicating the reference signal 428, in a flexible symbol, scheduled for reception by the UE, wherein the flexible symbol is configurable for use as a downlink symbol or an uplink symbol. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a scheduling message indicating a plurality of reference signals, in a flexible symbol, scheduled for reception by the UE, wherein the flexible symbol is configurable for use as a downlink symbol or an uplink symbol.

At 906, the UE may receive a configuration message configuring the flexible symbol as a full duplex symbol having uplink resources and downlink resources, at least one of the uplink resources or the downlink resources overlapping resources associated with the plurality of reference signals. For example, 906 may be performed by the reception component 1704. In some aspects, the UE may receive a configuration message configuring the flexible symbol as the full duplex symbol as the full duplex symbol 420 having the uplink resources 424 and the downlink resources 422. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a configuration message configuring the flexible symbol as a full duplex symbol having uplink resources and downlink resources, at least one of the uplink resources or the downlink resources overlapping resources associated with the plurality of reference signals.

At 908, the UE may measure at least a subset of the plurality of reference signals, wherein resources associated with the at least the subset of the plurality of reference signals overlap the downlink resources. For example, 908 may be performed by the measurement component 1706. In some aspects, the UE may measure (418) the reference signals 440, 442, or 444. The UE 104, 350, 402, or 502, the apparatus, 1702, the processing system 1914, the memory 360, the TX processor 368, the RX processor 356, the controller/processor 359, or the measurement component 1706 may be configured to or provide the means for measuring at least a subset of the plurality of reference signals, wherein the resources associated with the at least the subset of the plurality of reference signals overlap the downlink resources.

Figure 10:
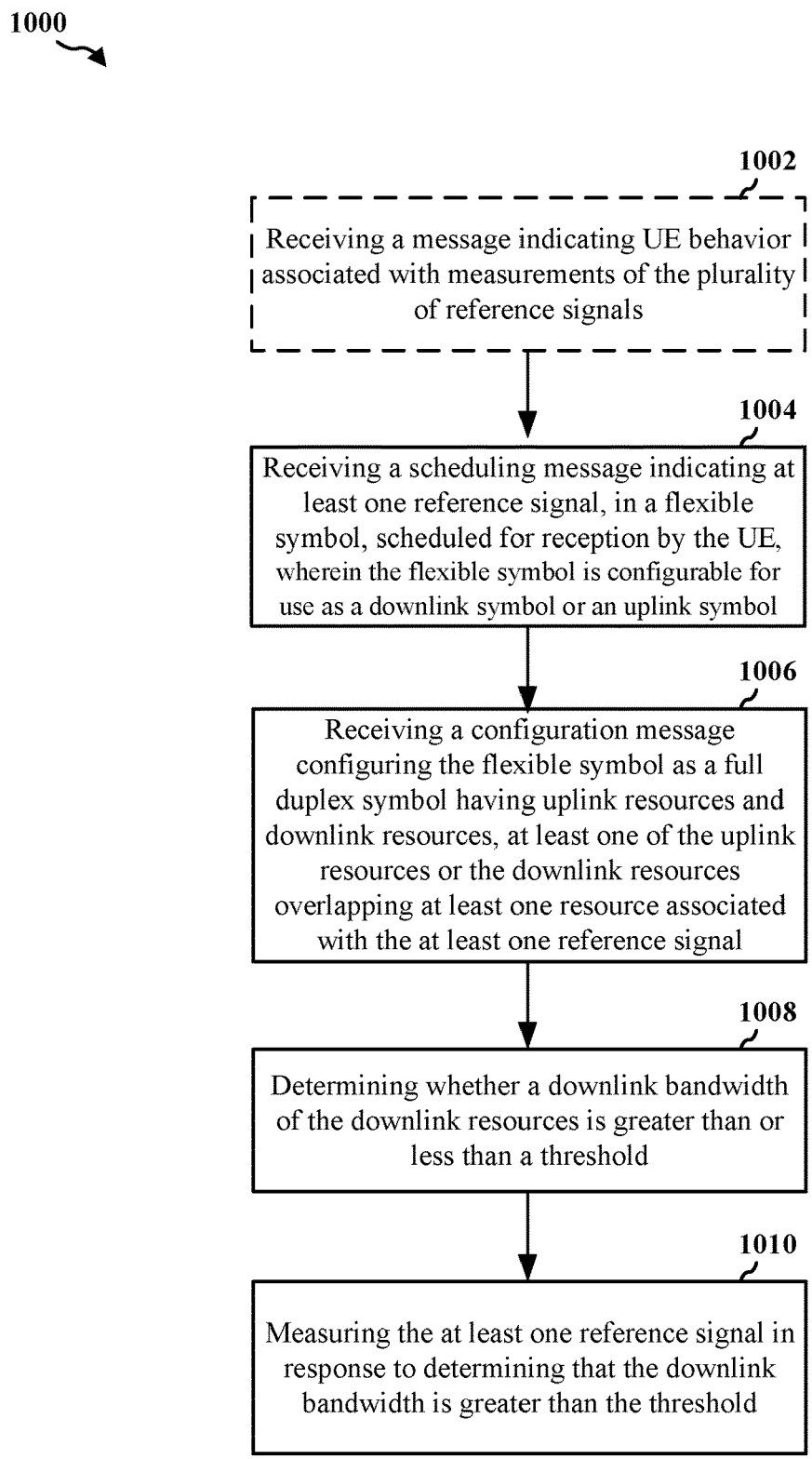
FIG. 10 is a flowchart illustrating a third method of wireless communication that supports the measuring of reference signals by a UE in accordance with some aspects of the present disclosure.

FIG. 10 is a flowchart 1000 of a method of wireless communication. The method may be performed by a UE (such as the UE 104, 350, 402, or 502; the apparatus 1702; the processing system 1914, which may include the memory 360 and which may be the entire UE 350 or a component of the UE 350, such as the TX processor 368, the RX processor 356, or the controller/processor 359).

At 1002, the UE may optionally receive a third message indicating UE behavior associated with measurements of the plurality of reference signals. For example, 1002 may be performed by the reception component 1704. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a third message indicating UE behavior associated with measurements of the plurality of reference signals.

At 1004, the UE may receive a scheduling message indicating at least one reference signal, in a flexible symbol, scheduled for reception by the UE, wherein the flexible symbol is configurable for use as a downlink symbol or an uplink symbol. For example, 1004 may be performed by the reception component 1704. In some aspects, the UE may receive a scheduling message indicating the reference signal 428, in a flexible symbol, scheduled for reception by the UE, wherein the flexible symbol is configurable for use as a downlink symbol or an uplink symbol. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a scheduling message indicating at least one reference signal, in a flexible symbol, scheduled for reception by the UE, wherein the flexible symbol is configurable for use as a downlink symbol or an uplink symbol.

At 1006, the UE may receive a configuration message configuring the flexible symbol as a full duplex symbol having uplink resources and downlink resources, at least one of the uplink resources or the downlink resources overlapping at least one resource associated with the at least one reference signal. For example, 1006 may be performed by the reception component 1704. In some aspects, the UE may receive a configuration message configuring the flexible symbol as the full duplex symbol as the full duplex symbol 420 having the uplink resources 424 and the downlink resources 422. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a configuration message configuring the flexible symbol as a full duplex symbol having uplink resources and downlink resources, at least one of the uplink resources or the downlink resources overlapping at least one resource associated with the at least one reference signal.

At 1008, the UE may determine whether a downlink bandwidth of the downlink resources is greater than or less than a threshold. For example, 1008 may be performed by the determining component 1708. In some aspects, the UE may determine if the sum of the first bandwidth 421 and the second bandwidth 423 is larger than or equal to the threshold bandwidth. The UE 104, 350, 402, or 502, the apparatus, 1702, the processing system 1914, the memory 360, the TX processor 368, the RX processor 356, the controller/processor 359, or the determining component 1708 may be configured to or provide the means for determining whether a downlink bandwidth of the downlink resources is greater than or less than a threshold.

At 1010, the UE may measure the at least one reference signal in response to determining that the downlink bandwidth is greater than the threshold. For example, 1010 may be performed by the measurement component 1706. In some aspects, the UE may measure (418) the reference signals 440, 442, or 444 if the sum of the first bandwidth 421 and the second bandwidth 423 is larger than or equal to the threshold bandwidth. The UE 104, 350, 402, or 502, the apparatus, 1702, the processing system 1914, the memory 360, the TX processor 368, the RX processor 356, the controller/processor 359, or the measurement component 1706 may be configured to or provide the means for measuring the at least one reference signal in response to determining that the downlink bandwidth is greater than the threshold. In some aspects, if the downlink bandwidth is less than the threshold, the UE may refrain from measuring the at least one reference signal.

Figure 11:
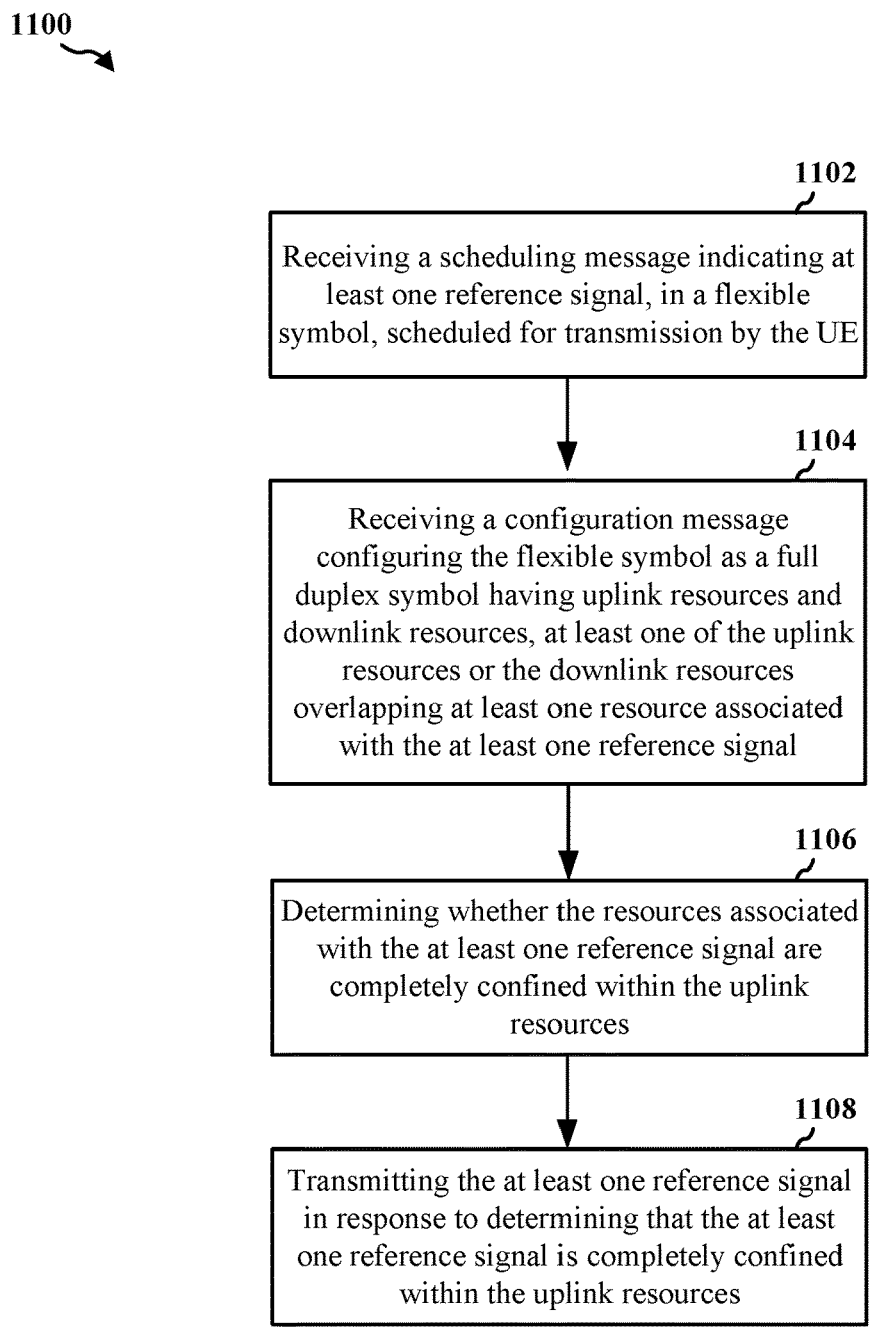
FIG. 11 is a flowchart illustrating a first method of wireless communication that supports the transmission of reference signals by a UE in accordance with some aspects of the present disclosure.

FIG. 11 is a flowchart 1100 of a method of wireless communication. The method may be performed by a UE (such as the UE 104, 350, 402, or 502; the apparatus 1702; the processing system 1914, which may include the memory 360 and which may be the entire UE 350 or a component of the UE 350, such as the TX processor 368, the RX processor 356, or the controller/processor 359).

At 1102, the UE may receive a scheduling message indicating at least one reference signal, in a flexible symbol, scheduled for transmission by the UE. For example, 1104 may be performed by the reception component 1704. In some aspects, the UE may receive (510) a scheduling message indicating the reference signal 528, in a flexible symbol, scheduled for transmission by the UE. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a scheduling message indicating at least one reference signal, in a flexible symbol, scheduled for transmission by the UE.

At 1104, the UE may receive a configuration message configuring the flexible symbol as a full duplex symbol having uplink resources and downlink resources, at least one of the uplink resources or the downlink resources overlapping at least one resource associated with the at least one reference signal. For example, 1104 may be performed by the reception component 1704. In some aspects, the UE may receive (512) a configuration message configuring the flexible symbol as the full duplex symbol as the full duplex symbol 520 having the uplink resources 524 and the downlink resources 522. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a configuration message configuring the flexible symbol as a full duplex symbol having uplink resources and downlink resources, at least one of the uplink resources or the downlink resources overlapping at least one resource associated with the at least one reference signal.

At 1106, the UE may determine whether the resources associated with the at least one reference signal are completely confined within the uplink resources. For example, 1106 may be performed by the determining component 1708. In some aspects, the UE may determine whether the resources of the reference signal 528 is completely confined within the uplink resources 524. The UE 104, 350, 402, or 502, the apparatus, 1702, the processing system 1914, the memory 360, the TX processor 368, the RX processor 356, the controller/processor 359, or the determining component 1708 may be configured to or provide the means for determining whether the resources associated with the at least one reference signal are completely confined within the uplink resources.

At 1108, the UE may transmit the at least one reference signal in response to determining that the at least one reference signal is completely confined within the uplink resources. For example, 1108 may be performed by the measurement component 1706. In some aspects, the UE may transmit the reference signals. The UE 104, 350, 402, or 502, the apparatus, 1702, the processing system 1914, the memory 360, the TX processor 368, the RX processor 356, the controller/processor 359, or the measurement component 1706 may be configured to or provide the means for transmitting the at least one reference signal in response to determining that the at least one reference signal is completely confined within the uplink resources.

Figure 12:
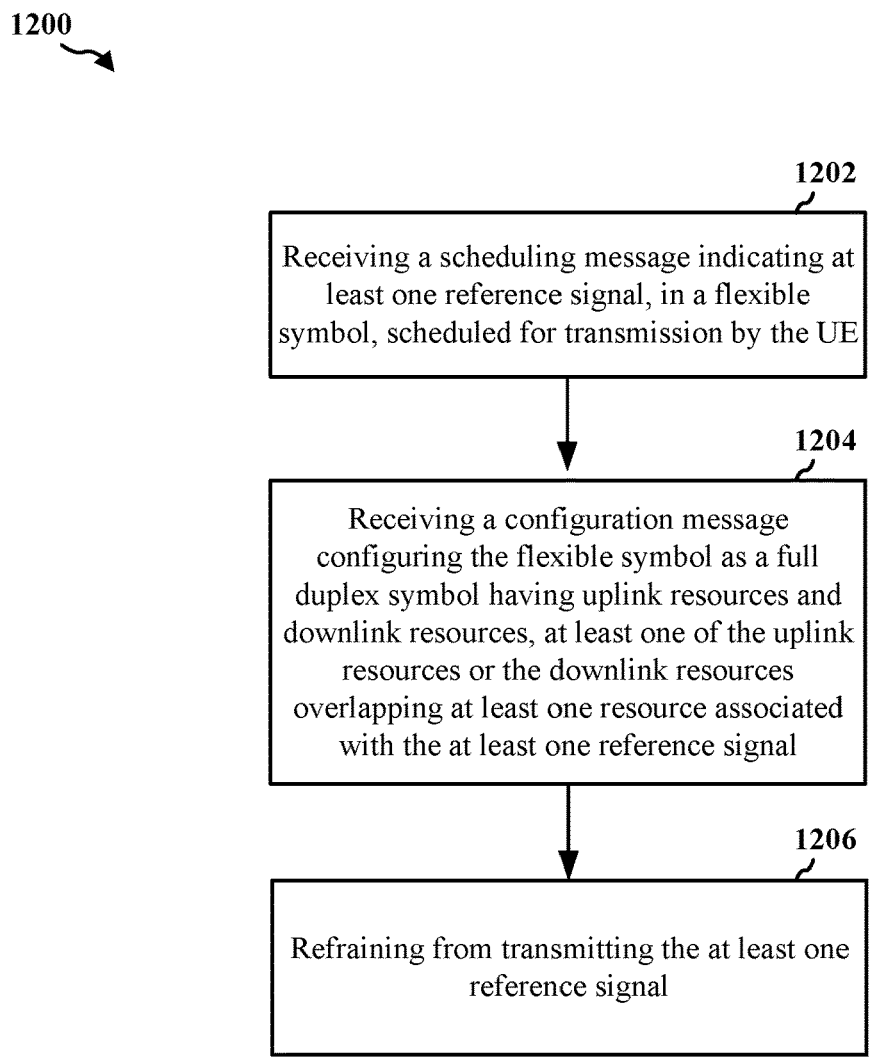
FIG. 12 is a flowchart illustrating a second method of wireless communication that supports the transmission of reference signals by a UE in accordance with some aspects of the present disclosure.

FIG. 12 is a flowchart 1200 of a method of wireless communication. The method may be performed by a UE (such as the UE 104, 350, 402, or 502; the apparatus 1702; the processing system 1914, which may include the memory 360 and which may be the entire UE 350 or a component of the UE 350, such as the TX processor 368, the RX processor 356, or the controller/processor 359).

At 1202, the UE may receive a scheduling message indicating at least one reference signal, in a flexible symbol, scheduled for transmission by the UE. For example, 1204 may be performed by the reception component 1704. In some aspects, the UE may receive (510) a scheduling message indicating the reference signal 528, in a flexible symbol, scheduled for transmission by the UE. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a scheduling message indicating at least one reference signal, in a flexible symbol, scheduled for transmission by the UE.

At 1204, the UE may receive a configuration message configuring the flexible symbol as a full duplex symbol having uplink resources and downlink resources, at least one of the uplink resources or the downlink resources overlapping at least one resource associated with the at least one reference signal. For example, 1204 may be performed by the reception component 1704. In some aspects, the UE may receive (512) a configuration message configuring the flexible symbol as the full duplex symbol as the full duplex symbol 520 having the uplink resources 524 and the downlink resources 522. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a configuration message configuring the flexible symbol as a full duplex symbol having uplink resources and downlink resources, at least one of the uplink resources or the downlink resources overlapping at least one resource associated with the at least one reference signal.

At 1206, the UE may refrain from transmitting the at least one reference signal. For example, 1206 may be performed by the measurement component 1706. In some aspects, the UE may refrain (514) from transmitting the at least one reference signal. The UE 104, 350, 402, or 502, the apparatus, 1702, the processing system 1914, the memory 360, the TX processor 368, the RX processor 356, the controller/processor 359, or the measurement component 1706 may be configured to or provide the means for refraining from transmitting the at least one reference signal.

Figure 13:
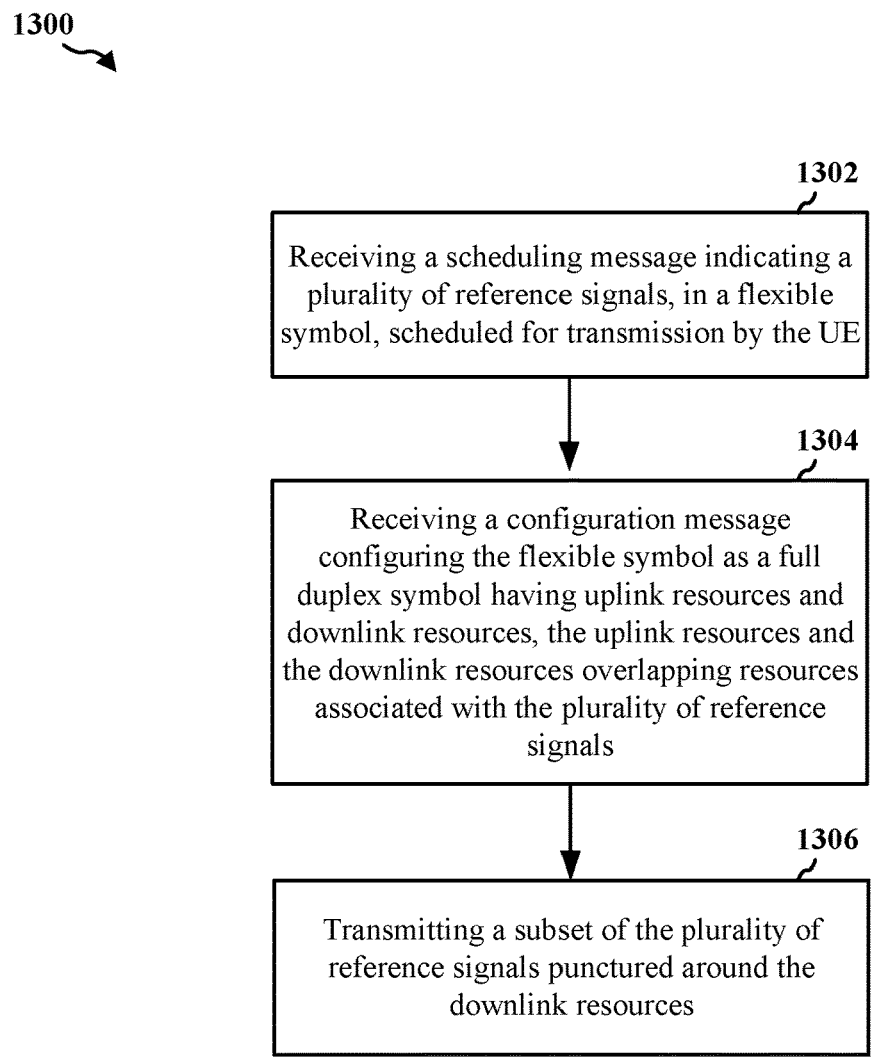
FIG. 13 is a flowchart illustrating a third method of wireless communication that supports the transmission of reference signals by a UE in accordance with some aspects of the present disclosure.

FIG. 13 is a flowchart 1300 of a method of wireless communication. The method may be performed by a UE (such as the UE 104, 350, 402, or 502; the apparatus 1702; the processing system 1914, which may include the memory 360 and which may be the entire UE 350 or a component of the UE 350, such as the TX processor 368, the RX processor 356, or the controller/processor 359).

At 1302, the UE may receive a scheduling message indicating a plurality of reference signals, in a flexible symbol, scheduled for transmission by the UE. For example, 1304 may be performed by the reception component 1704. In some aspects, the UE may receive (510) a scheduling message indicating the reference signal 528, in a flexible symbol, scheduled for transmission by the UE. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a scheduling message indicating a plurality of reference signals, in a flexible symbol, scheduled for transmission by the UE.

At 1304, the UE may receive a configuration message configuring the flexible symbol as a full duplex symbol having uplink resources and downlink resources, the uplink resources and the downlink resources overlapping resources associated with the plurality of reference signals. For example, 1304 may be performed by the reception component 1704. In some aspects, the UE may receive (512) a configuration message configuring the flexible symbol as the full duplex symbol as the full duplex symbol 520 having the uplink resources 524 and the downlink resources 522. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a configuration message configuring the flexible symbol as a full duplex symbol having uplink resources and downlink resources, the uplink resources and the downlink resources overlapping resources associated with the plurality of reference signals.

At 1306, the UE may transmit a subset of the plurality of reference signals punctured around the downlink resources. For example, 1308 may be performed by the measurement component 1706. In some aspects, the UE may transmit the reference signal 540. The UE 104, 350, 402, or 502, the apparatus, 1702, the processing system 1914, the memory 360, the TX processor 368, the RX processor 356, the controller/processor 359, or the measurement component 1706 may be configured to or provide the means for transmitting a subset of the plurality of reference signals punctured around the downlink resources.

Figure 14:
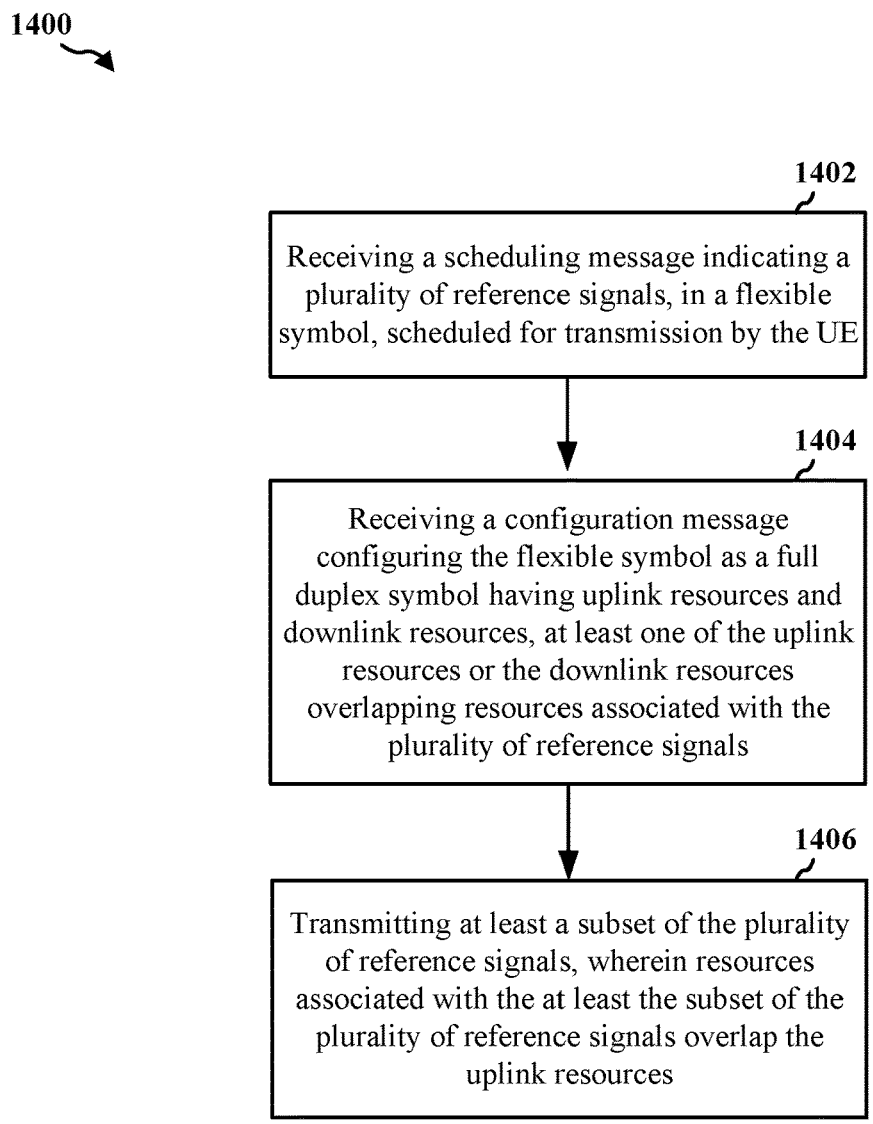
FIG. 14 is a flowchart illustrating a fourth method of wireless communication that supports the transmission of reference signals by a UE in accordance with some aspects of the present disclosure.

FIG. 14 is a flowchart 1400 of a method of wireless communication. The method may be performed by a UE (such as the UE 104, 350, 402, or 502; the apparatus 1702; the processing system 1914, which may include the memory 360 and which may be the entire UE 350 or a component of the UE 350, such as the TX processor 368, the RX processor 356, or the controller/processor 359).

At 1402, the UE may receive a scheduling message indicating a plurality of reference signals, in a flexible symbol, scheduled for transmission by the UE. For example, 1404 may be performed by the reception component 1704. In some aspects, the UE may receive (510) a scheduling message indicating the reference signal 528, in a flexible symbol, scheduled for transmission by the UE. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a scheduling message indicating a plurality of reference signals, in a flexible symbol, scheduled for transmission by the UE.

At 1404, the UE may receive a configuration message configuring the flexible symbol as a full duplex symbol having uplink resources and downlink resources, at least one of the uplink resources or the downlink resources overlapping resources associated with the plurality of reference signals. For example, 1404 may be performed by the reception component 1704. In some aspects, the UE may receive (512) a configuration message configuring the flexible symbol as the full duplex symbol as the full duplex symbol 520 having the uplink resources 524 and the downlink resources 522. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a configuration message configuring the flexible symbol as a full duplex symbol having uplink resources and downlink resources, at least one of the uplink resources or the downlink resources overlapping resources associated with the plurality of reference signals.

At 1406, the UE may transmit at least a subset of the plurality of reference signals, wherein resources associated with the at least the subset of the plurality of reference signals overlap the uplink resources. For example, 1408 may be performed by the measurement component 1706. In some aspects, the UE may transmit the reference signal 542. The UE 104, 350, 402, or 502, the apparatus, 1702, the processing system 1914, the memory 360, the TX processor 368, the RX processor 356, the controller/processor 359, or the measurement component 1706 may be configured to or provide the means for transmitting at least a subset of the plurality of reference signals, wherein resources associated with the at least the subset of the plurality of reference signals overlap the uplink resources.

Figure 15:
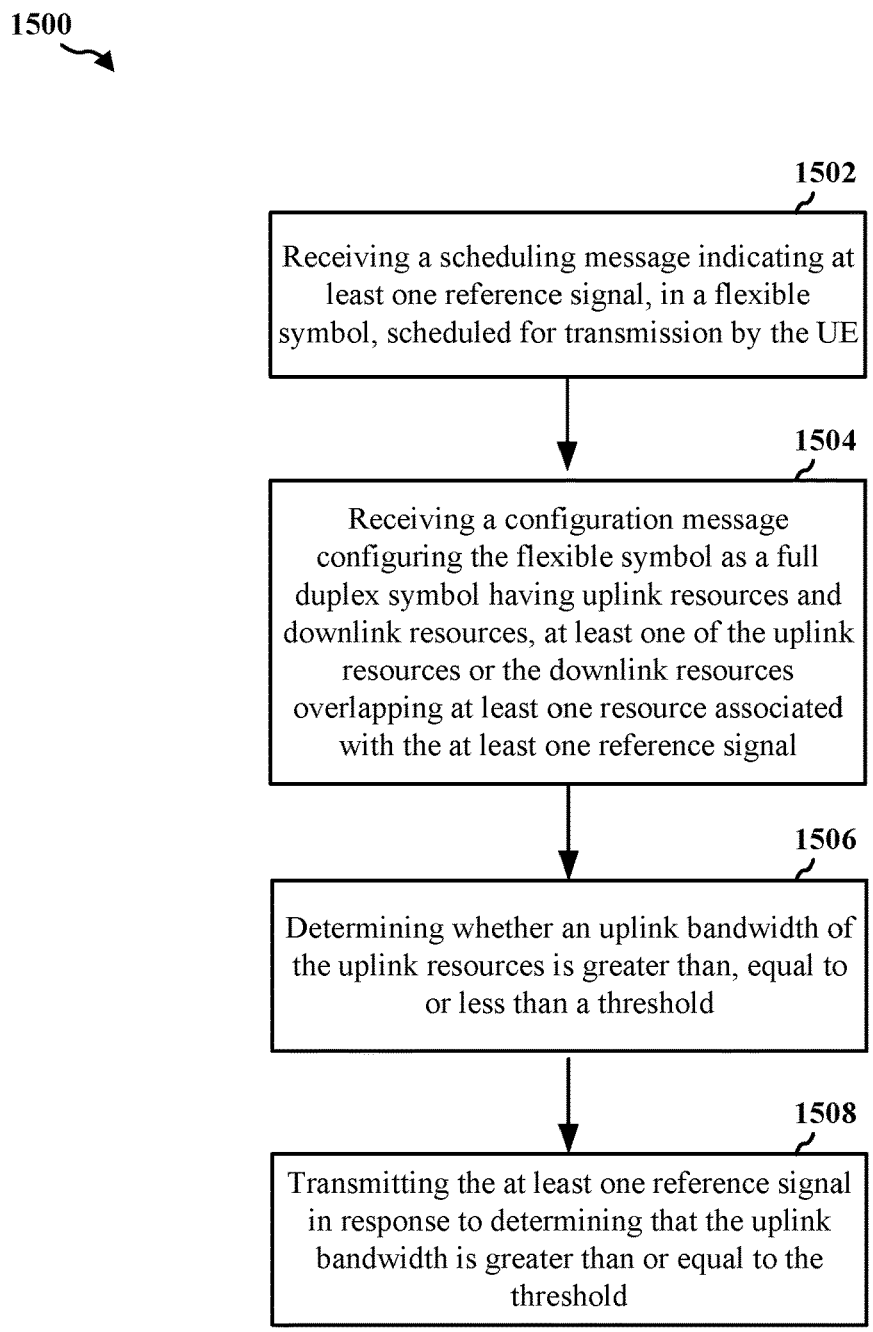
FIG. 15 is a flowchart illustrating a fifth method of wireless communication that supports the transmission of reference signals by a UE in accordance with some aspects of the present disclosure.

FIG. 15 is a flowchart 1500 of a method of wireless communication. The method may be performed by a UE (such as the UE 104, 350, 402, or 502; the apparatus 1702; the processing system 1914, which may include the memory 360 and which may be the entire UE 350 or a component of the UE 350, such as the TX processor 368, the RX processor 356, or the controller/processor 359).

At 1502, the UE may receive a scheduling message indicating at least one reference signal, in a flexible symbol, scheduled for transmission by the UE. For example, 1504 may be performed by the reception component 1704. In some aspects, the UE may receive (510) a scheduling message indicating the reference signal 528, in a flexible symbol, scheduled for transmission by the UE. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a scheduling message indicating at least one reference signal, in a flexible symbol, scheduled for transmission by the UE.

At 1504, the UE may receive a configuration message configuring the flexible symbol as a full duplex symbol having uplink resources and downlink resources, at least one of the uplink resources or the downlink resources overlapping at least one resource associated with the at least one reference signal. For example, 1504 may be performed by the reception component 1704. In some aspects, the UE may receive (512) a configuration message configuring the flexible symbol as the full duplex symbol as the full duplex symbol 520 having the uplink resources 524 and the downlink resources 522. The UE 104, 350, 402, or 502, the apparatus, 1702, the processing system 1914, the memory 360, the TX processor 368, the RX processor 356, the controller/processor 359, or the reception component 1704 may be configured to or provide the means for receiving a configuration message configuring the flexible symbol as a full duplex symbol having uplink resources and downlink resources, at least one of the uplink resources or the downlink resources overlapping at least one resource associated with the at least one reference signal.

At 1506, the UE may determine whether an uplink bandwidth of the uplink resources is greater than or less than a threshold. For example, 1506 may be performed by the determining component 1708. In some aspects, the UE may determine whether the bandwidth 525 of the uplink resources 524 is greater than, equal to, or less than the bandwidth threshold. The UE 104, 350, 402, or 502, the apparatus, 1702, the processing system 1914, the memory 360, the TX processor 368, the RX processor 356, the controller/processor 359, or the determining component 1708 may be configured to or provide the means for determining whether an uplink bandwidth of the uplink resources is greater than or less than a threshold.

At 1508, the UE may transmit the at least one reference signal in response to determining that the uplink bandwidth is greater than the threshold. For example, 1508 may be performed by the measurement component 1706. In some aspects, the UE may transmit the reference signals 540 or 542. The UE 104, 350, 402, or 502, the apparatus, 1702, the processing system 1914, the memory 360, the TX processor 368, the RX processor 356, the controller/processor 359, or the measurement component 1706 may be configured to or provide the means for transmitting the at least one reference signal in response to determining that the uplink bandwidth is greater than the threshold.

Figure 16:
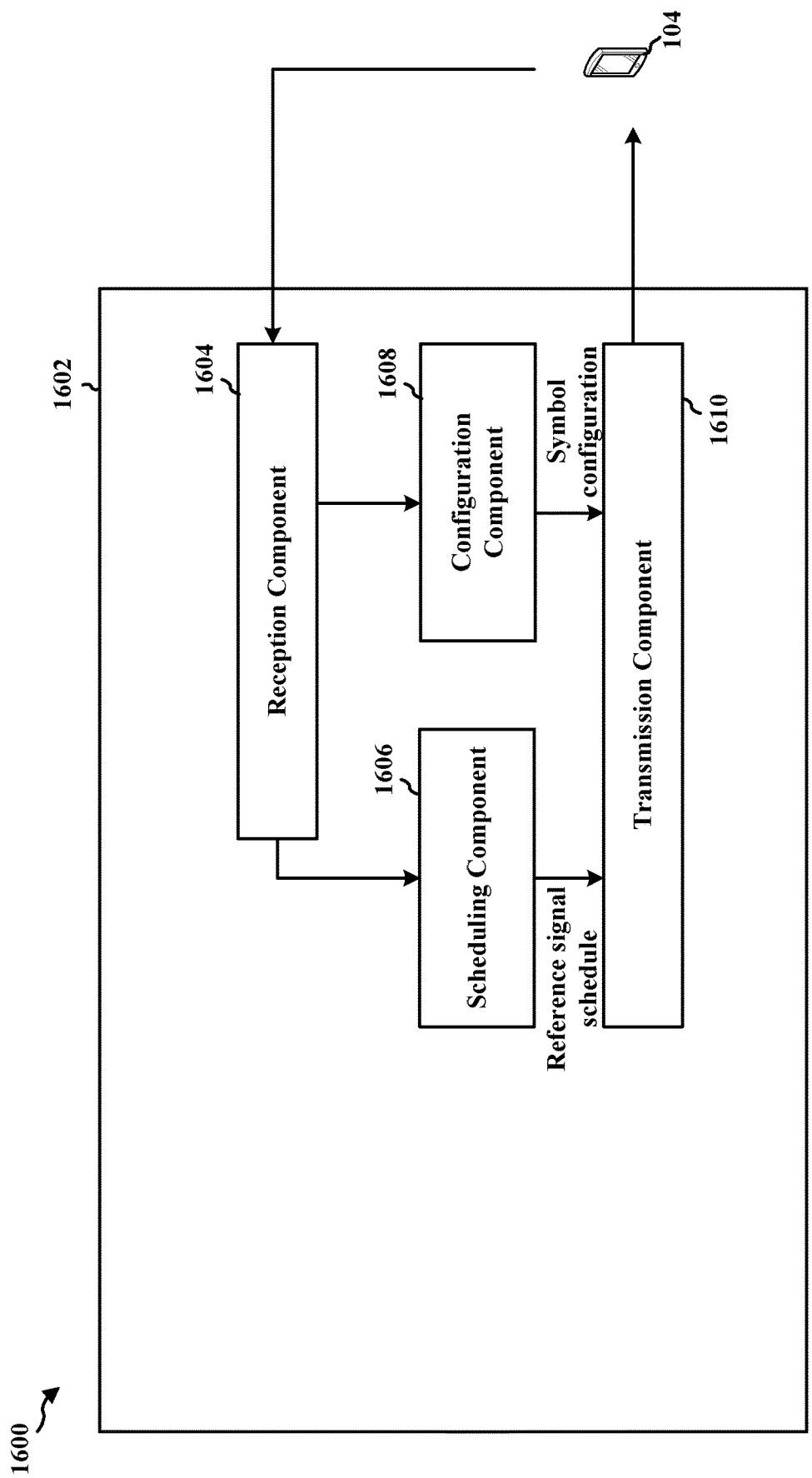
FIG. 16 is a conceptual data flow diagram illustrating the data flow between different components in an example apparatus in accordance with some aspects of the present disclosure.

FIG. 16 is a conceptual data flow diagram 1600 illustrating the data flow between different means/components in an example apparatus 1602. The apparatus may be a base station. The apparatus 1602 includes a reception component 1604 that receives reference signals. The apparatus 1602 includes a scheduling component 1606 that schedules reference signals in a flexible symbol, such as the feature described in connection with 702 of FIG. 7. The apparatus includes a configuration component 1608 that configures a flexible symbol as a full duplex symbol, such as the feature described in connection with 704 of FIG. 7. The apparatus includes a transmission component 1610 that transmits configuration messages or reference signals, such as the feature described in connection with 706 and 708 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for by a processor, or some combination thereof.

Figure 17:
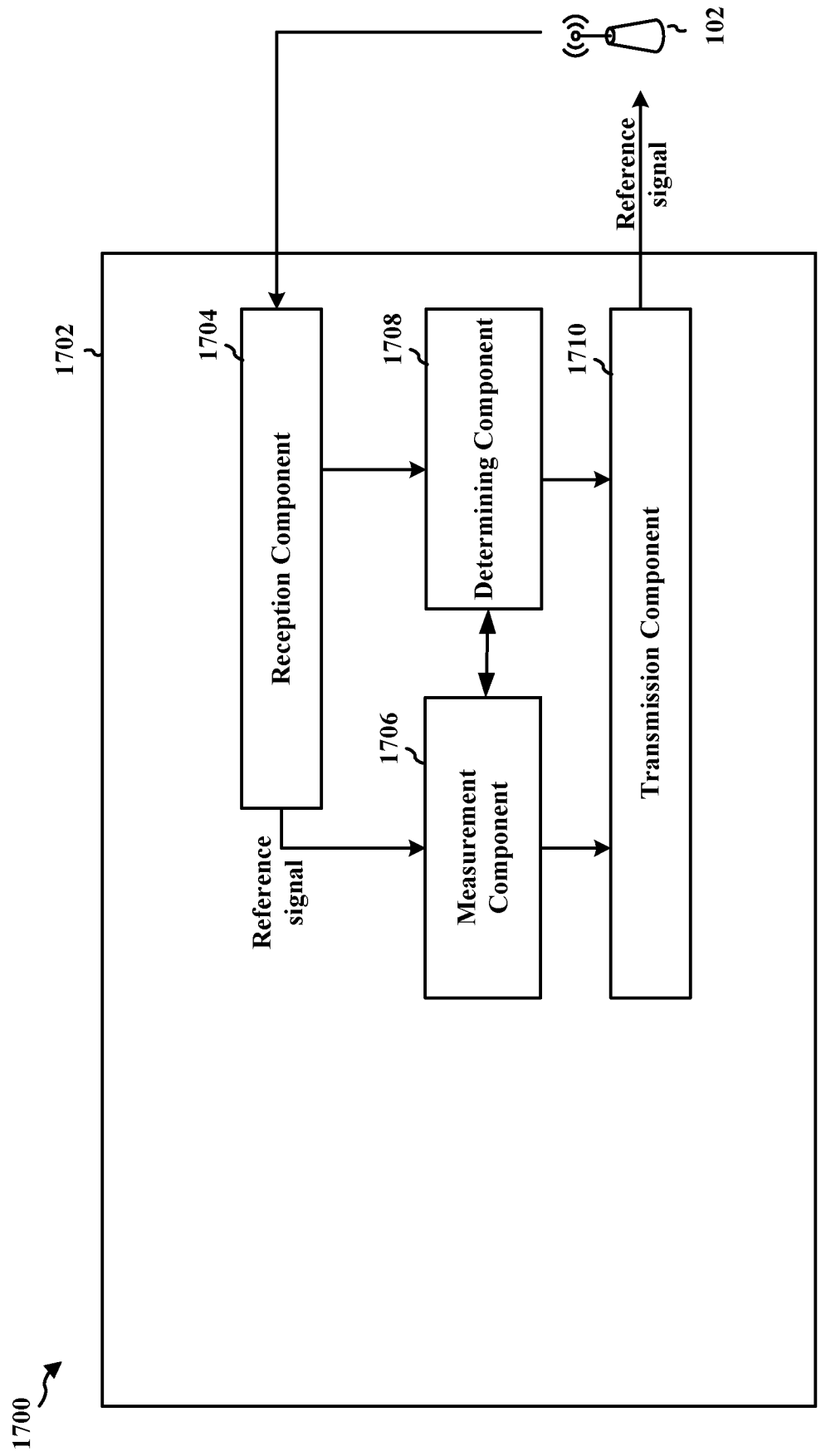
FIG. 17 is a conceptual data flow diagram illustrating the data flow between different components in an example apparatus in accordance with some aspects of the present disclosure.

FIG. 17 is a conceptual data flow diagram 1700 illustrating the data flow between different means/components in an example apparatus 1702. The apparatus may be a UE. The apparatus 1702 includes a reception component 1704 that receives scheduling messages, configuration messages, or reference signals, such as the feature described in connection with 804 and 806 of FIGS. 8, 904 and 906 of FIGS. 9, 1004 and 1006 of FIGS. 10, 1102 and 1104 of FIGS. 11, 1202 and 1204 of FIGS. 12, 1302 and 1304 of FIGS. 13, 1402 and 1404 of FIGS. 14, 1502 and 1504 of FIG. 15, and 1602 and 1604 of FIG. 16. The apparatus includes a measurement component 1706 that measures or refrains from measuring the reference signals received by the UE, such as the feature described in connection with 808 of FIG. 8, 908 of FIG. 9, and 1010 of FIG. 10. The apparatus 1702 includes a determining component 1708 that determines whether to measure or refrain from measuring reference signals or whether to transmit or refrain from transmitting reference signals, such as the feature described in connection with 1008 of FIG. 10, 1106 of FIG. 11, and 1506 of FIG. 15. The apparatus 1702 includes a transmission component 1710 that transmits or refrains from transmitting configuration reference signals, such as the feature described in connection with 1108 of FIG. 11, 1206 of FIG. 12, 1306 of FIG. 13, 1406 of FIG. 14, and 1508 of FIG. 15.

The apparatus may include additional components that perform each of the blocks of the algorithm in the aforementioned flowcharts of FIGS. 8-15. As such, each block in the aforementioned flowcharts of FIGS. 8-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for by a processor, or some combination thereof.

Figure 18:
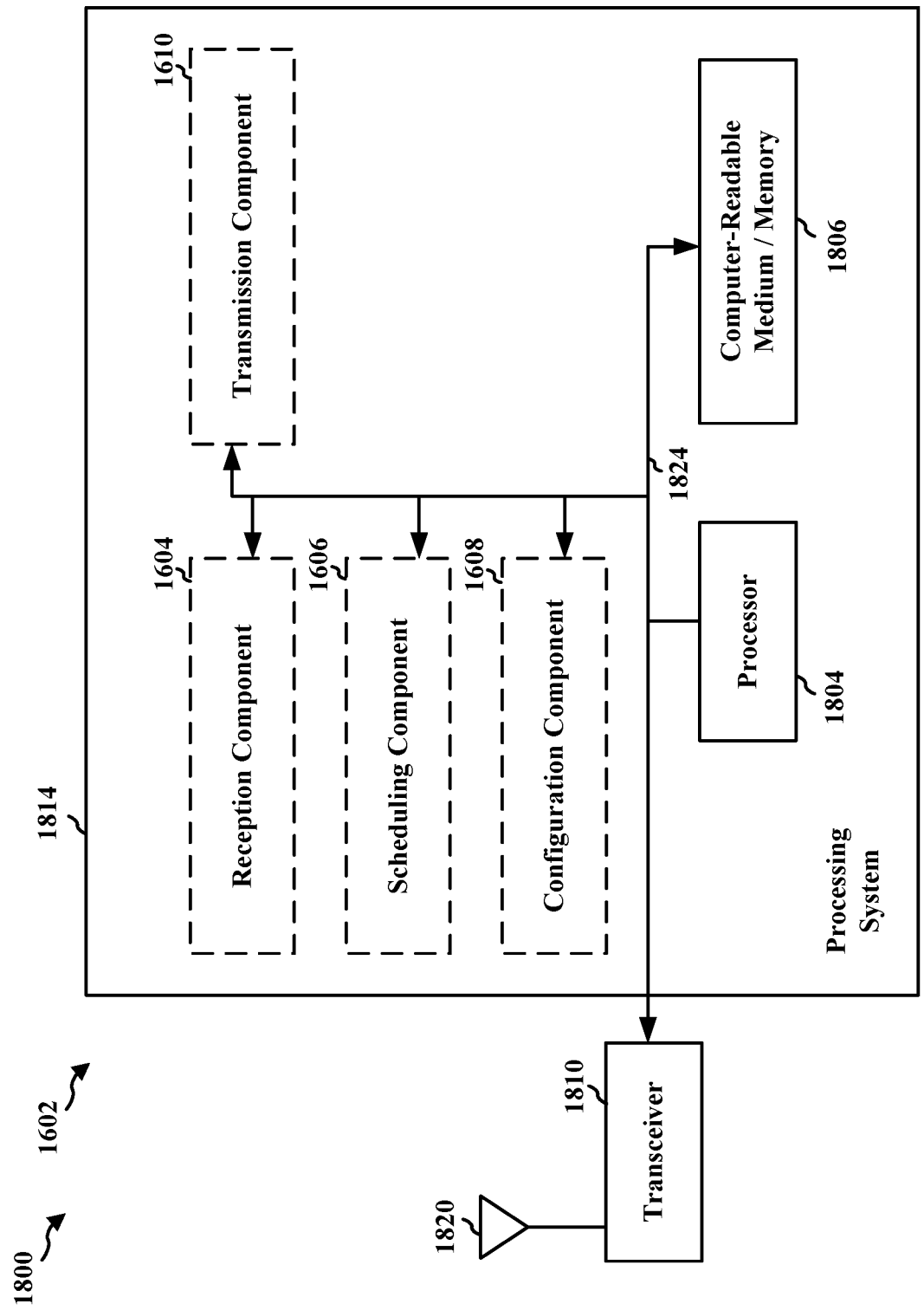
FIG. 18 is a diagram illustrating an example of a hardware implementation for an apparatus employing a processing system in accordance with some aspects of the present disclosure.

FIG. 18 is a diagram 1800 illustrating an example of a hardware for an apparatus 1602 employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors or hardware components, represented by the processor 1804, the components 1604, 1606, 1608, and 1610, and the computer-readable medium/memory 1806. The bus 1824 may also link various other circuits such as timing sources, peripherals, voltage regulators, and power management circuits.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1604. In addition, the transceiver 1810 receives information from the processing system 1814, specifically the transmission component 1610, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described herein for any particular apparatus. The computer-readable medium/memory 1806 may also be used for storing data that is manipulated by the processor 1804 when executing software. The processing system 1814 further includes at least one of the components 1604, 1606, 1608, and 1610. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 or at least one of the TX processor 316, the RX processor 370, and the controller/processor 375. Alternatively, the processing system 1814 may be the entire base station (such as see 310 of FIG. 3).

In one configuration, the apparatus 1602 for wireless communication includes means for scheduling at least one reference signal in a flexible symbol, wherein the flexible symbol is configurable for use as a downlink symbol or an uplink symbol, configuring the flexible symbol as a full duplex symbol having uplink resources and downlink resources, at least one of the uplink resources or the downlink resources overlapping at least one resource associated with the at least one reference signal, transmitting a configuration message indicating configuration of the flexible symbol as the full duplex symbol, transmitting the at least one reference signal punctured around the uplink resources or in the at least one resource associated with the at least one reference signal. The aforementioned means may be one or more of the aforementioned components of the apparatus 1602 or the processing system 1814 of the apparatus 1602 configured to perform the functions recited by the aforementioned means. As described herein, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
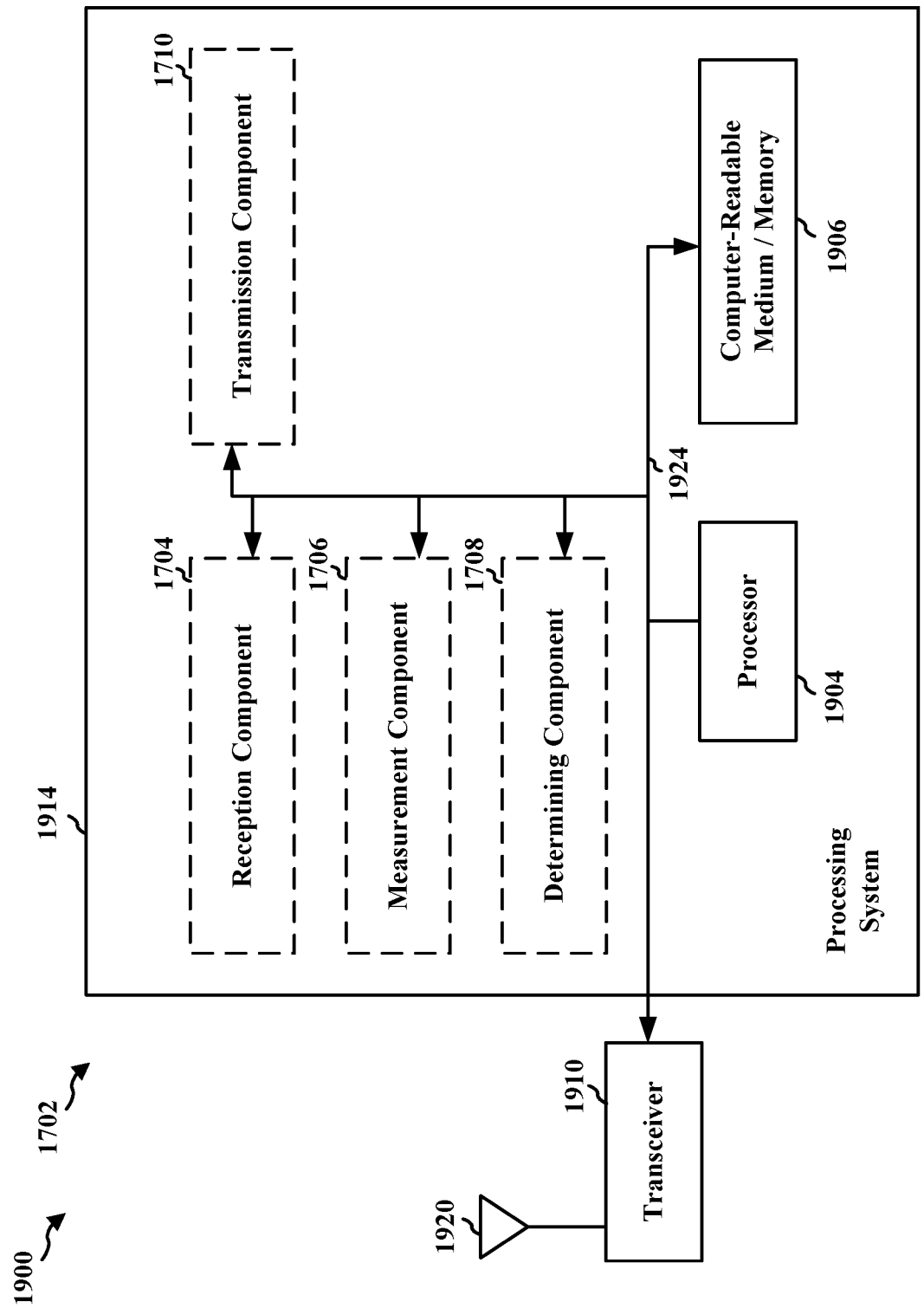
FIG. 19 is a diagram illustrating an example of a hardware implementation for an apparatus employing a processing system in accordance with some aspects of the present disclosure.

FIG. 19 is a diagram 1900 illustrating an example of a hardware for an apparatus 1702 employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors or hardware components, represented by the processor 1904, the components 1704, 1706, 1708, and 1710, and the computer-readable medium/memory 1906. The bus 1924 may also link various other circuits such as timing sources, peripherals, voltage regulators, and power management circuits.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1704. In addition, the transceiver 1910 receives information from the processing system 1914, specifically the transmission component 1710, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described herein for any particular apparatus. The computer-readable medium/memory 1906 may also be used for storing data that is manipulated by the processor 1904 when executing software. The processing system 1914 further includes at least one of the components 1704, 1706, 1708, and 1710. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 or at least one of the TX processor 368, the RX processor 356, and the controller/processor 359. Alternatively, the processing system 1914 may be the entire UE (such as see 350 of FIG. 3).

In one configuration, the apparatus 1702 for wireless communication includes means for receiving a scheduling message, receiving a configuration message, refraining from measuring at least one reference signal, measuring at least one reference signal, determining whether a downlink bandwidth of the downlink resources is greater than or less than a threshold, determining whether the resources associated with the at least one reference signal are completely confined within the uplink resources, determining whether an uplink bandwidth of the uplink resources is greater than or less than a threshold, refraining from transmitting the at least one reference signal, and transmitting the at least one reference signal. The aforementioned means may be one or more of the aforementioned components of the apparatus 1702 or the processing system 1914 of the apparatus 1702 configured to perform the functions recited by the aforementioned means. As described herein, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following aspects are illustrative only and aspects thereof may be combined with aspects of other embodiments or teaching described herein, without limitation.

Aspect 1 is a method of wireless communication by a BS, including scheduling at least one reference signal in a flexible symbol, wherein the flexible symbol is configurable for use as a downlink symbol or an uplink symbol, configuring the flexible symbol as a full duplex symbol having uplink resources and downlink resources, at least one of the uplink resources or the downlink resources overlapping at least one resource associated with the at least one reference signal, transmitting a configuration message indicating configuration of the flexible symbol as the full duplex symbol, and transmitting the at least one reference signal punctured around the uplink resources or in the at least one resource associated with the at least one reference signal.

Aspect 2 is a method of wireless communication by a UE including receiving a scheduling message indicating at least one reference signal, in a flexible symbol, scheduled for reception by the UE, wherein the flexible symbol is configurable for use as a downlink symbol or an uplink symbol, receiving a configuration message configuring the flexible symbol as a full duplex symbol having uplink resources and downlink resources, at least one of the uplink resources or the downlink resources overlapping at least one resource associated with the at least one reference signal; and refraining from measuring the at least one reference signal.

Aspect 3 is a method of wireless communication by a UE including receiving a scheduling message indicating a plurality of reference signals, in a flexible symbol, scheduled for reception by the UE, wherein the flexible symbol is configurable for use as a downlink symbol or an uplink symbol, receiving a configuration message configuring the flexible symbol as a full duplex symbol having uplink resources and downlink resources, at least one of the uplink resources or the downlink resources overlapping resources associated with the plurality of reference signals, and measuring at least a subset of the plurality of reference signals, wherein resources associated with the at least the subset of the plurality of reference signals overlap the downlink resources.

Aspect 4 is a method of wireless communication by a UE including receiving a scheduling message indicating at least one reference signal, in a flexible symbol, scheduled for reception by the UE, wherein the flexible symbol is configurable for use as a downlink symbol or an uplink symbol, receiving a configuration message configuring the flexible symbol as a full duplex symbol having uplink resources and downlink resources, at least one of the uplink resources or the downlink resources overlapping at least one resource associated with the at least one reference signal, determining whether a downlink bandwidth of the downlink resources is greater than or less than a threshold, and measuring the at least one reference signal in response to determining that the downlink bandwidth is greater than the threshold.

In aspect 5, the method of Aspect 4 includes receiving a third message indicating UE behavior associated with measurements of a plurality of reference signals.

In Aspect 6, the method of Aspect 5 includes where the third message includes a bit indicating whether the UE is to measure the plurality of reference signals.

In Aspect 7, the method of Aspect 5 includes where the third message includes an indication of one or more conditions associated with determining whether the UE is to measure the plurality of reference signals.

In Aspect 8, the method of any of Aspects 5 to 7 includes where the third message includes at least one of DCI, a RRC configuration, or a MAC CE that indicates the UE behavior associated with measurements of the plurality of reference signals.

Aspect 9 is a method of wireless communication by a UE including receiving a scheduling message indicating at least one reference signal, in a flexible symbol, scheduled for transmission by the UE, receiving a configuration message configuring the flexible symbol as a full duplex symbol having uplink resources and downlink resources, at least one of the uplink resources or the downlink resources overlapping at least one resource associated with the at least one reference signal, determining whether the resources associated with the at least one reference signal are completely confined within the uplink resources, and transmitting the at least one reference signal in response to determining that the at least one reference signal is completely confined within the uplink resources.

Aspect 10 is a method of wireless communication by a UE including receiving a scheduling message indicating at least one reference signal, in a flexible symbol, scheduled for transmission by the UE, receiving a configuration message configuring the flexible symbol as a full duplex symbol having uplink resources and downlink resources, at least one of the uplink resources or the downlink resources overlapping at least one resource associated with the at least one reference signal, and refraining from transmitting the at least one reference signal.

Aspect 11 is a method of wireless communication by a UE including receiving a scheduling message indicating a plurality of reference signals, in a flexible symbol, scheduled for transmission by the UE, receiving a configuration message configuring the flexible symbol as a full duplex symbol having uplink resources and downlink resources, the uplink resources and the downlink resources overlapping resources associated with the plurality of reference signals, and transmitting a subset of the plurality of reference signals punctured around the downlink resources.

Aspect 12 is a method of wireless communication by a UE including receiving a scheduling message indicating a plurality of reference signals, in a flexible symbol, scheduled for transmission by the UE, receiving a configuration message configuring the flexible symbol as a full duplex symbol having uplink resources and downlink resources, at least one of the uplink resources or the downlink resources overlapping resources associated with the plurality of reference signals, and transmitting at least a subset of the plurality of reference signals, the resources associated with the at least a subset of the plurality of reference signals overlapping the uplink resources.

Aspect 13 is a method of wireless communication by a UE including receiving a scheduling message indicating at least one reference signal, in a flexible symbol, scheduled for transmission by the UE, receiving a configuration message configuring the flexible symbol as a full duplex symbol having uplink resources and downlink resources, at least one of the uplink resources or the downlink resources overlapping at least one resource associated with the at least one reference signal, determining whether an uplink bandwidth of the uplink resources is greater than or less than a threshold, and transmitting the at least one reference signal in response to determining that the uplink bandwidth is greater than the threshold.

Aspect 14 is a method of wireless communication by a BS including scheduling at least one reference signal in a flexible symbol, wherein the flexible symbol is configurable for use as a downlink symbol or an uplink symbol, configuring the flexible symbol as a full duplex symbol having uplink resources and downlink resources, at least one of the uplink resources or the downlink resources overlapping at least one resource associated with the at least one reference signal, transmitting a configuration message indicating configuration of the flexible symbol as the full duplex symbol, and transmitting the at least one reference signal punctured around the uplink resources or in the at least one resource associated with the at least one reference signal.

In Aspect 15, the method of Aspect 14 includes transmitting a configuration message indicating UE behavior associated with measurements of multiple reference signals.

In Aspect 16, the method of Aspect 15 includes where the configuration message includes a bit indicating whether the UE is to measure the multiple reference signals.

In Aspect 17, the method of Aspect 15 includes where the configuration message includes an indication of one or more conditions associated with determining whether the UE is to measure the multiple reference signals.

In Aspect 18, the method of any of Aspects 15 to 17 includes where the configuration message includes at least one of DCI, a RRC configuration, or a MAC CE that indicates the UE behavior associated with measurements of the multiple reference signals.

Aspect 19 is a method of wireless communication by a BS including scheduling at least a first reference signal in a first resource of a flexible symbol, where the flexible symbol is configurable for use as a downlink symbol or an uplink symbol, configuring the flexible symbol as a full duplex symbol having uplink resources and downlink resources, at least one of the uplink resources or the downlink resources overlapping the first resource associated with the at least first reference signal, scheduling at least a second reference signal in a second resource after configuring the flexible symbol as the full duplex symbol, where at least a portion of the first resource does not overlap with at least a portion of the second resource, transmitting a configuration message indicating configuration of the flexible symbol as the full duplex symbol, and transmitting the at least second reference signal instead of the at least first reference signal.

In Aspect 20, the method of Aspect 19 includes where the at least second reference signal includes a CSI-RS.

Aspect 21 is a method of wireless communication by a UE including receiving a scheduling message indicating at least one reference signal, in a flexible symbol, scheduled for reception by the UE, where the flexible symbol is configurable for use as a downlink symbol or an uplink symbol, receiving a configuration message configuring the flexible symbol as a full duplex symbol having uplink resources and downlink resources, at least one of the uplink resources or the downlink resources overlapping at least one resource associated with the at least one reference signal, and at least one of refraining from measuring the at least one reference signal, or measuring at least a subset of a plurality of reference signals, where the at least one reference signal includes the plurality of reference signals in the flexible symbol, and where resources associated with at least the subset of the plurality of reference signals at least partially overlap the downlink resources.

In Aspect 22, the method of Aspect 21 includes where measuring the at least a subset of the plurality of reference signals is based on a format of a downlink bandwidth of the downlink resources or an uplink bandwidth of the uplink resources.

In Aspect 23, the method of Aspect 22 includes where measuring the at least a subset of the plurality of reference signals comprises measuring the at least a subset of the plurality of reference signals where the downlink bandwidth is greater than a threshold.

In Aspect 24, the method of any of Aspects 21 to 23 includes where the at least a subset of the plurality of reference signals includes a downlink CSI-RS.

In Aspect 25, the method of any of Aspects 21 to 24 includes performing at least one of a channel measurement or an interference measurement based on measuring at least the subset of the plurality of reference signals.

In Aspect 26, the method of any of Aspects 21 to 25 includes where measuring at least the subset of the plurality of reference signals includes measuring at least the subset of the plurality of reference signals over a first portion of resources that at least partially overlap the downlink resources without measuring over a second portion of the resources that at least partially overlap the uplink resources.

In Aspect 27, the method of any of Aspects 21 to 26 includes receiving a configuration message indicating UE behavior associated with measurements of multiple reference signals.

In Aspect 28, the method of Aspect 27 includes where the configuration message includes a bit indicating whether the UE is to measure the multiple reference signals, where measuring at least the plurality of reference signals is based on the bit.

In Aspect 29, the method of any of Aspects 27 or 28 includes where the configuration message includes an indication of one or more conditions associated with determining whether the UE is to measure the multiple reference signals, where measuring at least the plurality of reference signals is based on the one or more conditions.

In Aspect 30, the method of any of Aspects 27 to 29 includes where the configuration message includes at least one of DCI, a RRC configuration, or a MAC CE that indicates the UE behavior associated with measurements of the multiple reference signals.

In Aspect 31, the method of any of Aspects 21 to 30 includes where refraining from measuring the at least one reference signal is based on a format of a downlink bandwidth of the downlink resources or an uplink bandwidth of the uplink resources.

In Aspect 32, the method of Aspect 31 includes where refraining from measuring the at least one reference signal is based on the downlink bandwidth not achieving a threshold.

Aspect 33 is an apparatus for wireless communication including a transceiver, a memory configured to store instructions, and one or more processors communicatively coupled with the memory and the transceiver, wherein the one or more processors are configured to execute the instructions to cause the apparatus to perform any of the methods of Aspects 1 to 32.

Aspect 34 is an apparatus for wireless communication including means for performing any of the methods of Aspects 1 to 32.

Aspect 35 is a computer-readable medium including code executable by one or more processors for wireless communications, the code including code for performing any of the methods of Aspects 1 to 32.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and aspects are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station (BS), comprising:
    scheduling at least one reference signal in a flexible symbol, wherein the flexible symbol is configurable for use as a downlink symbol or an uplink symbol;
    configuring the flexible symbol as a full duplex symbol having uplink resources and downlink resources, at least one of the uplink resources or the downlink resources overlapping at least one resource associated with the at least one reference signal;
    transmitting a configuration message indicating configuration of the flexible symbol as the full duplex symbol; and
    transmitting the at least one reference signal punctured around the uplink resources or in the at least one resource associated with the at least one reference signal.

2. The method of claim 1, further comprising transmitting a second configuration message indicating to a user equipment (UE) a UE behavior associated with measurements of multiple reference signals.

3. The method of claim 2, wherein the second configuration message includes a bit indicating whether the UE is to measure the multiple reference signals.

4. The method of claim 2, wherein the second configuration message includes an indication of one or more conditions associated with determining whether the UE is to measure the multiple reference signals.

5. The method of claim 2, wherein the second configuration message includes at least one of downlink control information (DCI), a radio resource control (RRC) configuration, or a medium access control (MAC) control element (CE) that indicates the UE behavior associated with the measurements of the multiple reference signals.

6. A method of wireless communication by a user equipment (UE), comprising:
receiving a scheduling message indicating at least one reference signal, in a flexible symbol, scheduled for reception by the UE, wherein the flexible symbol is configurable for use as a downlink symbol or an uplink symbol;
receiving a configuration message configuring the flexible symbol as a full duplex symbol having uplink resources and downlink resources, at least one of the uplink resources or the downlink resources overlapping at least one resource associated with the at least one reference signal; and
measuring at least a subset of a plurality of reference signals, wherein the at least one reference signal includes the plurality of reference signals in the flexible symbol, and wherein resources associated with the at least the subset of the plurality of reference signals are punctured around the downlink resources.

7. The method of claim 6, measuring the at least the subset of the plurality of reference signals is based on a format of a downlink bandwidth of the downlink resources or an uplink bandwidth of the uplink resources.

8. The method of claim 7, wherein measuring the at least the subset of the plurality of reference signals comprises measuring the at least the subset of the plurality of reference signals where the downlink bandwidth is greater than a threshold.

9. The method of claim 6, wherein the at least the subset of the plurality of reference signals includes a downlink channel state information (CSI) reference signal (CSI-RS).

10. The method of claim 6, further comprising performing at least one of a channel measurement or an interference measurement based on measuring at least the subset of the plurality of reference signals.

11. The method of claim 6, wherein measuring at least the subset of the plurality of reference signals includes measuring at least the subset of the plurality of reference signals over a first portion of the resources that at least partially overlap the downlink resources without measuring over a second portion of the resources that at least partially overlap the uplink resources.

12. The method of claim 6, further comprising:
receiving a second configuration message indicating UE behavior associated with measurements of multiple reference signals.

13. The method of claim 12, wherein the second configuration message includes a bit indicating whether the UE is to measure the multiple reference signals, wherein measuring at least the plurality of reference signals is based on the bit.

14. The method of claim 12, wherein the second configuration message includes an indication of one or more conditions associated with determining whether the UE is to measure the multiple reference signals, wherein measuring at least the plurality of reference signals is based on the one or more conditions.

15. The method of claim 12, wherein the second configuration message includes at least one of downlink control information (DCI), a radio resource control (RRC) configuration, or a medium access control (MAC) control element (CE) that indicates the UE behavior associated with the measurements of the multiple reference signals.

16. The method of claim 6, wherein refraining from measuring the at least one reference signal is based on a format of a downlink bandwidth of the downlink resources or an uplink bandwidth of the uplink resources.

17. The method of claim 16, wherein refraining from measuring the at least one reference signal is based on the downlink bandwidth not achieving a threshold.

18. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
schedule at least one reference signal in a flexible symbol, wherein the flexible symbol is configurable for use as a downlink symbol or an uplink symbol;
configure the flexible symbol as a full duplex symbol having uplink resources and downlink resources, at least one of the uplink resources or the downlink resources overlapping at least one resource associated with the at least one reference signal;
transmit a configuration message indicating configuration of the flexible symbol as the full duplex symbol; and
transmit the at least one reference signal punctured around the uplink resources or in the at least one resource associated with the at least one reference signal.

19. The apparatus of claim 18, wherein the one or more processors are further configured to execute the instructions to cause the apparatus to:
transmit a second configuration message indicating to a user equipment (UE) a UE behavior associated with measurements of multiple reference signals.

20. The apparatus of claim 19, wherein the second configuration message includes at least one of a bit indicating whether the UE is to measure the multiple reference signals or an indication of one or more conditions associated with determining whether the UE is to measure the multiple reference signals.

21. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
receive a scheduling message indicating at least one reference signal, in a flexible symbol, scheduled for reception by a user equipment (UE), wherein the flexible symbol is configurable for use as a downlink symbol or an uplink symbol;
receive a configuration message configuring the flexible symbol as a full duplex symbol having uplink resources and downlink resources, at least one of the uplink resources or the downlink resources overlapping at least one resource associated with the at least one reference signal; and
measure at least a subset of a plurality of reference signals, wherein the at least one reference signal includes the plurality of reference signals in the flexible symbol, and wherein resources associated with at least the subset of the plurality of reference signals are punctured around the downlink resources.

22. The apparatus of claim 21, wherein the one or more processors are configured to execute the instructions to cause the apparatus to measure the at least the subset of the plurality of reference signals based on a format of a downlink bandwidth of the downlink resources or an uplink bandwidth of the uplink resources.

23. The apparatus of claim 22, wherein the one or more processors are configured to execute the instructions to cause the apparatus to measure the at least the subset of the plurality of reference signals where the downlink bandwidth is greater than a threshold.

24. The apparatus of claim 21, wherein the one or more processors are further configured to execute the instructions to cause the apparatus to perform at least one of a channel measurement or an interference measurement based on measuring at least the subset of the plurality of reference signals.

25. The apparatus of claim 21, wherein the one or more processors are configured to execute the instructions to cause the apparatus to measure at least the subset of the plurality of reference signals over a first portion of the resources that at least partially overlap the downlink resources without measuring over a second portion of the resources that at least partially overlap the uplink resources.

26. The apparatus of claim 21, wherein the one or more processors are further configured to execute the instructions to cause the apparatus to:
receive a second configuration message indicating user equipment (UE) behavior associated with measurements of multiple reference signals.

27. The apparatus of claim 26, wherein the second configuration message includes a bit indicating whether the UE is to measure the multiple reference signals, wherein the one or more processors are configured to execute the instructions to cause the apparatus to measure at least the plurality of reference signals based on the bit.

28. The apparatus of claim 26, wherein the second configuration message includes an indication of one or more conditions associated with determining whether the UE is to measure the multiple reference signals, wherein the one or more processors are configured to execute the instructions to cause the apparatus to measure at least the plurality of reference signals based on the one or more conditions.

29. The apparatus of claim 21, wherein the one or more processors are configured to execute the instructions to cause the apparatus to refrain from measuring the at least one reference signal based on a format of a downlink bandwidth of the downlink resources or an uplink bandwidth of the uplink resources.

30. The apparatus of claim 29, wherein the one or more processors are configured to execute the instructions to cause the apparatus to refrain from measuring the at least one reference signal based on the downlink bandwidth not achieving a threshold.

\* \* \* \* \*